(12) United States Patent
Spurgeon et al.

(10) Patent No.: US 11,806,879 B2
(45) Date of Patent: *Nov. 7, 2023

(54) SHIPPING SYSTEM AND CONTROL SYSTEM FOR SECURE PACKAGE DELIVERY

(71) Applicant: DVW Holdings, LLC, Leawood, KS (US)

(72) Inventors: Daniel A. Spurgeon, Raytown, MO (US); Vernon Hugh McGee, II, Clay Center, KS (US)

(73) Assignee: DVW Holdings, LLC, Leawood, KS (US)

( * ) Notice: Subject to any disclaimer, the term of this patent is extended or adjusted under 35 U.S.C. 154(b) by 338 days.

This patent is subject to a terminal disclaimer.

(21) Appl. No.: 16/944,357

(22) Filed: Jul. 31, 2020

(65) Prior Publication Data
US 2021/0031370 A1 Feb. 4, 2021

Related U.S. Application Data

(60) Provisional application No. 62/881,669, filed on Aug. 1, 2019.

(51) Int. Cl.
*G06Q 50/28* (2012.01)
*B25J 9/16* (2006.01)
(Continued)

(52) U.S. Cl.
CPC ........... *B25J 9/1669* (2013.01); *B25J 9/1697* (2013.01); *B25J 13/087* (2013.01); *B65G 1/1373* (2013.01); *G06Q 50/28* (2013.01); *G06K 7/10297* (2013.01)

(58) Field of Classification Search
CPC ...... B25J 9/1669; B25J 9/1697; B25J 13/087; B25J 11/00; B65G 1/1373; G06Q 50/28; G06Q 10/083; G06K 7/10297
(Continued)

(56) References Cited

U.S. PATENT DOCUMENTS 6,426,699 B1 7/2002 Porter
8,854,216 B2 10/2014 Uchida
(Continued)

FOREIGN PATENT DOCUMENTS

GB 2362704 11/2001
GB 2364697 2/2002
(Continued)

OTHER PUBLICATIONS

International Search Report and Written Opinion from PCT/US2020/044425 entitled: Shipping System and Control System for Secure Package Delivery.

*Primary Examiner* — B M M Hannan
(74) *Attorney, Agent, or Firm* — HOVEY WILLIAMS LLP

(57) ABSTRACT

A control system is configured to facilitate transfer of a package between a room in a building and a delivery service outside the room associated with a shipment order. The system controls a shiftable panel of the building to selectively provide a path into and out of the room. The system includes a location sensor and a system processor. The location sensor is configured to sense package location data associated with the location of the package relative to the panel. The system processor is configured to receive package identification data associated with the package, permit panel opening to allow room ingress and egress along the path based on the package identification data, determine that the package has been transferred into or out of the room via the path based on package location data from the location sensor, and secure the panel closed to restrict room ingress and egress along the path based on package location data from the location sensor sensing that the package has been transferred into or out of the room via the path.

35 Claims, 22 Drawing Sheets

(51) Int. Cl.
   *B65G 1/137* (2006.01)
   *B25J 13/08* (2006.01)
   *G06K 7/10* (2006.01)

(58) Field of Classification Search
   USPC ........................................................ 700/245
   See application file for complete search history.

(56) References Cited

U.S. PATENT DOCUMENTS

| | | | |
|---|---|---|---|
| 8,989,053 B1* | 3/2015 | Skaaksrud | H04L 67/10 |
| | | | 370/255 |
| 9,211,025 B1 | 12/2015 | Elhawwashy | |
| 9,315,344 B1* | 4/2016 | Lehmann | B65B 59/001 |
| 9,764,836 B1 | 9/2017 | Elzinga et al. | |
| 9,861,221 B2 | 1/2018 | Jiang | |
| 9,926,737 B2 | 3/2018 | Wanjohi | |
| 10,310,500 B1 | 6/2019 | Brady | |
| 10,351,261 B1 | 7/2019 | Bryant | |
| 10,509,403 B2 | 12/2019 | Chao et al. | |
| 10,929,804 B2* | 2/2021 | Ladden | G06Q 10/0833 |
| 11,222,299 B1* | 1/2022 | Baalke | G06Q 10/087 |
| 11,346,150 B1 | 5/2022 | Johnston | |
| 2003/0006275 A1 | 1/2003 | Gray | |
| 2012/0158606 A1 | 6/2012 | Moudy | |
| 2015/0235165 A1* | 8/2015 | Miette | B07C 3/02 |
| | | | 705/337 |
| 2015/0379468 A1* | 12/2015 | Harvey | G06Q 10/08355 |
| | | | 705/338 |
| 2016/0090248 A1* | 3/2016 | Worsley | B65G 61/00 |
| | | | 414/398 |
| 2017/0107056 A1* | 4/2017 | Kadaba | B60P 1/52 |
| 2017/0323545 A1* | 11/2017 | Gillen | G06Q 10/083 |
| 2018/0096270 A1 | 4/2018 | High et al. | |
| 2018/0194575 A1* | 7/2018 | Anderson | G06Q 10/08 |
| 2018/0225628 A1 | 8/2018 | Roy | |
| 2018/0247474 A1 | 8/2018 | Matsuyama | |
| 2019/0088054 A1 | 3/2019 | Wulf et al. | |
| 2019/0180544 A1 | 6/2019 | Newcomb | |
| 2019/0265717 A1 | 8/2019 | McHale et al. | |

FOREIGN PATENT DOCUMENTS

| | | |
|---|---|---|
| WO | 2004065745 | 8/2004 |
| WO | 2019170934 A1 | 9/2019 |

* cited by examiner

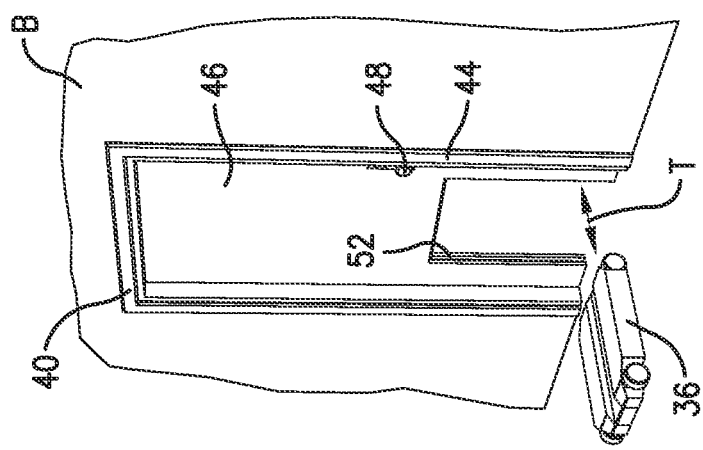
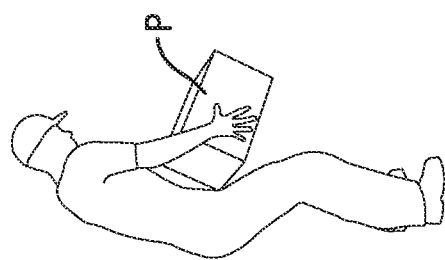
Fig. 6.
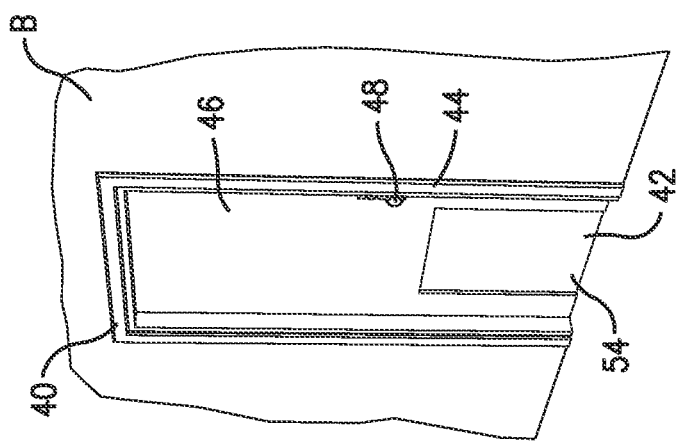
Fig. 5.

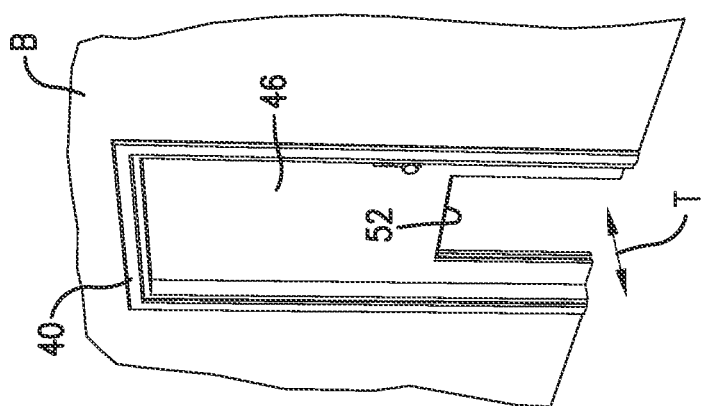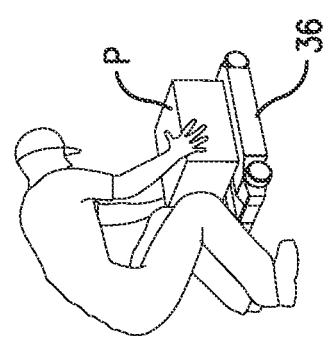
Fig. 8.
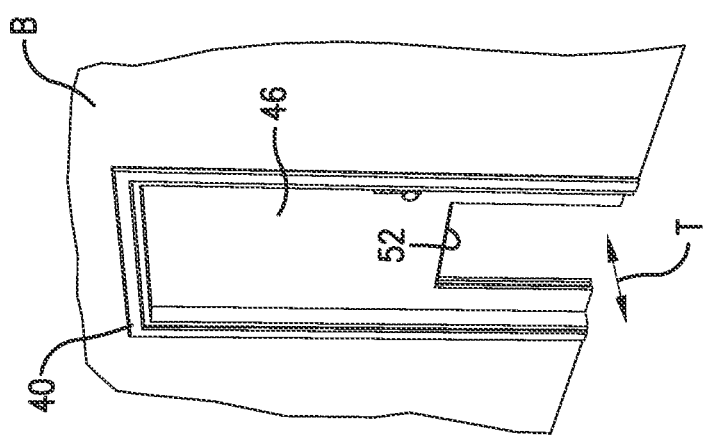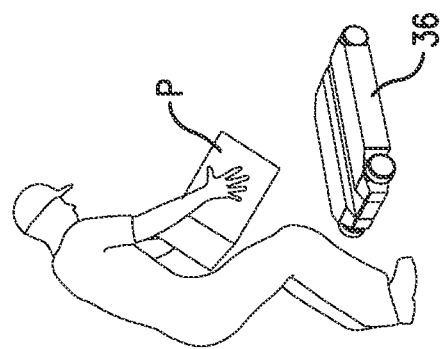
Fig. 7.

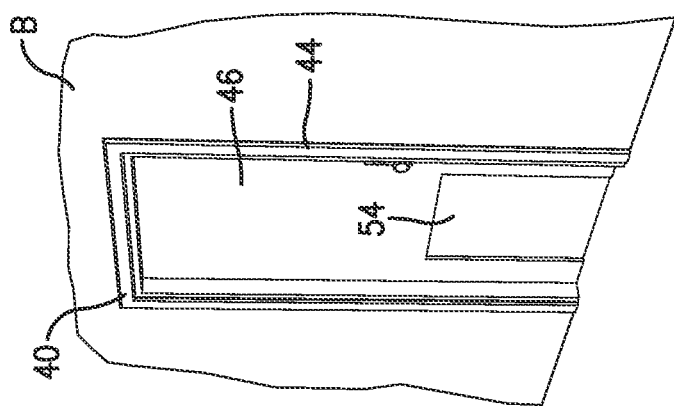
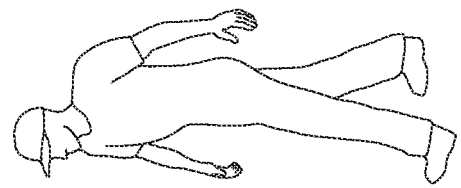
Fig. 10.
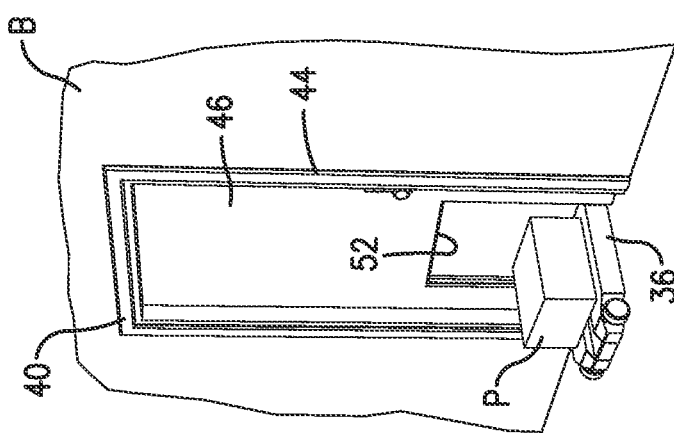
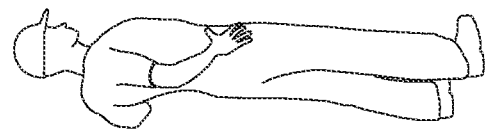
Fig. 9.

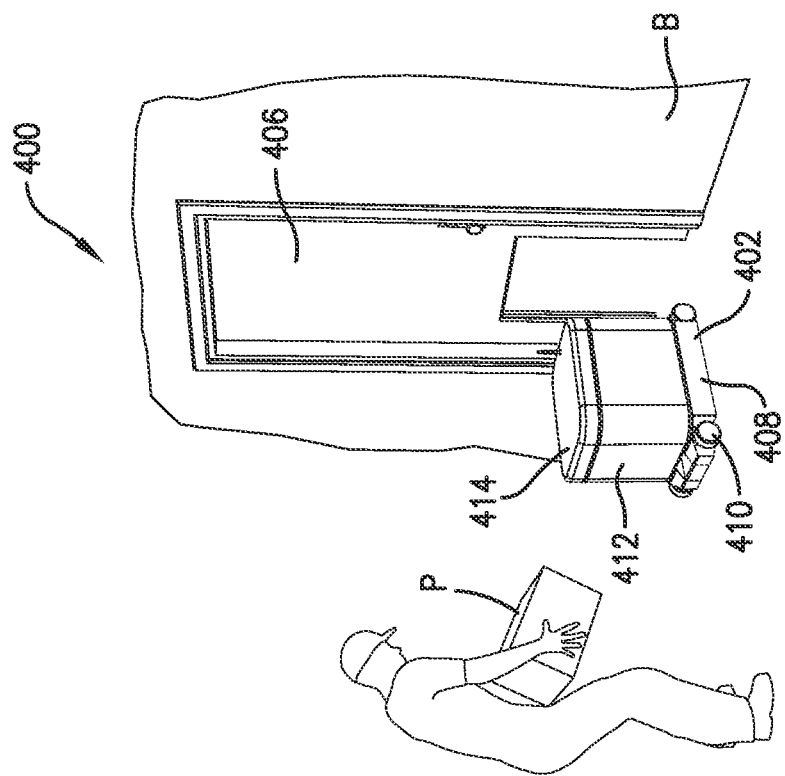
Fig. 17.
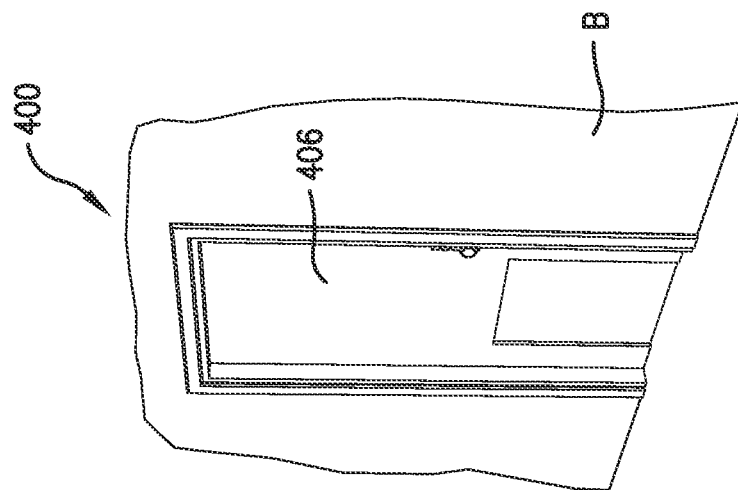
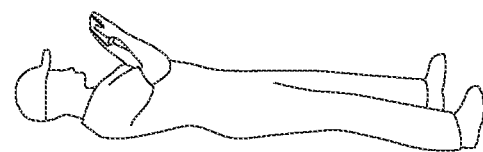
Fig. 16.

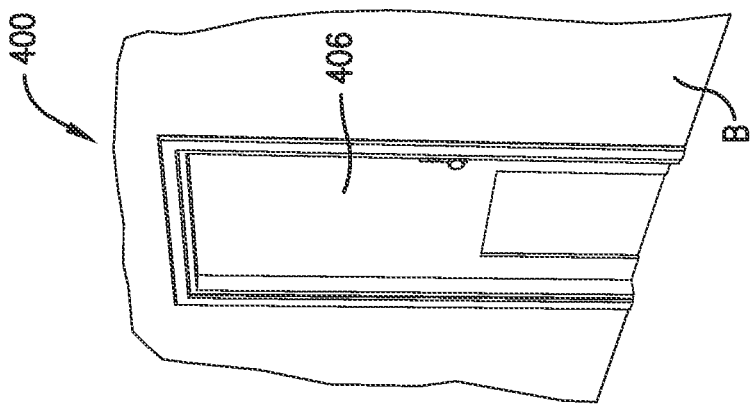
Fig. 21.
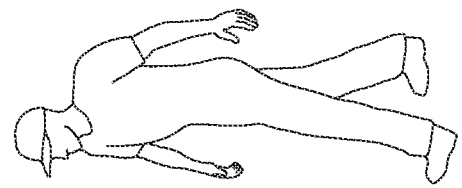
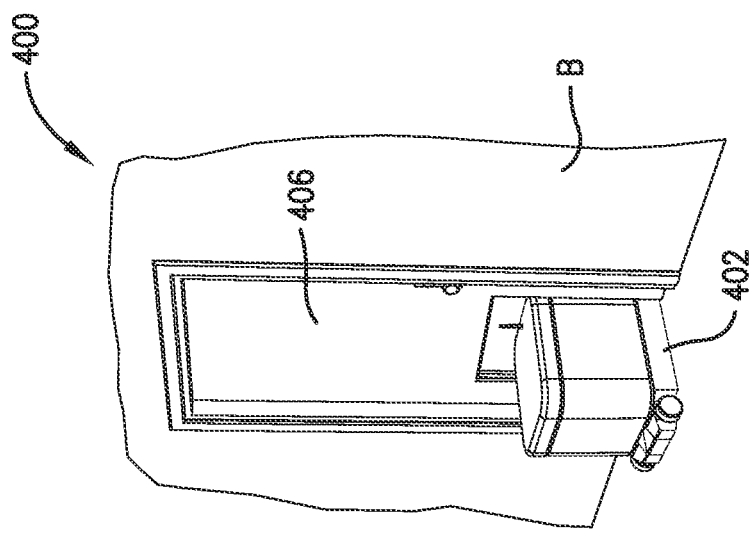
Fig. 20.
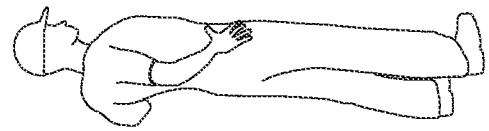

SHIPPING SYSTEM AND CONTROL SYSTEM FOR SECURE PACKAGE DELIVERY

CROSS-REFERENCE TO RELATED APPLICATIONS

This application claims the benefit of U.S. Provisional Application Ser. No. 62/881,669, filed Aug. 1, 2019, entitled ELECTRONIC DEVICE FOR SECURE PACKAGE DELIVERY, which is hereby incorporated in its entirety by reference herein.

BACKGROUND

1. Field

The present invention relates generally to shipping systems. More specifically, embodiments of the present invention concern a shipping system and a control system operable to provide secure package delivery.

2. Discussion of Prior Art

Prior art shipping methods include secure and unsecure methods for transferring a delivery item from a sender or transferring a delivery item to a recipient. Conventional post office practices utilize secure mailbox equipment to securely hold a sender's delivery item prior to shipment. Similarly, conventional secure mailbox equipment is generally provided by the post office or shipping service and may be used to securely hold a recipient's delivery item when it is received. It is known for secure mailboxes to be utilized at a post office, at places of business, or at other locations near a residential location or place of business.

With the proliferation of online retailers, drop-shipping services, and home delivery services, conventional mailbox equipment and shipping practices have several notable deficiencies. For instance, prior art home deliveries and services are known to leave delivered items unsecured at a location. For unsecured delivery items, instances of theft and tampering are pervasive and well-known. Furthermore, it is also common for delivery items to be sent to the wrong address by home delivery services.

This background discussion is intended to provide information related to the present invention which is not necessarily prior art.

SUMMARY

The following brief summary is provided to indicate the nature of the subject matter disclosed herein. While certain aspects of the present invention are described below, the summary is not intended to limit the scope of the present invention.

Embodiments of the present invention provide a shipping system and a control system that do not suffer from the problems and limitations of prior art devices, including those devices set forth above.

A first aspect of the present invention concerns a control system configured to facilitate transfer of a package between a room in a building and a delivery vehicle outside the room associated with a shipment order. The control system is for controlling a shiftable panel of the building to selectively provide a path into and out of the room and an autonomous vehicle configured to be advanced along the path to receive the package. The control system broadly includes a location sensor, a vehicle sensor, and a system processor. The location sensor is configured to sense package location data associated with the location of the package relative to the panel. The vehicle sensor is configured to sense vehicle location data associated with the location of the autonomous vehicle relative to the panel. The system processor is configured to receive package identification data associated with the package, permit panel opening to allow room ingress and egress along the path based on the package identification data, move the autonomous vehicle to a location adjacent the panel to receive the package, based on the vehicle location data, and secure the panel closed to restrict room ingress and egress along the path based on package location data from the location sensor and corresponding to a determination that the package has been transferred into or out of the room via the path.

A second aspect of the present invention concerns a control system configured to facilitate transfer of a package between a room in a building and a delivery service outside the room associated with a shipment order. The control system is for controlling a shiftable panel of the building to selectively provide a path into and out of the room. The system broadly includes a location sensor and a system processor. The location sensor is configured to sense package location data associated with the location of the package relative to the panel. The system processor is configured to receive package identification data associated with the package, permit panel opening to allow room ingress and egress along the path based on the package identification data, determine that the package has been transferred into or out of the room via the path based on package location data from the location sensor, and secure the panel closed to restrict room ingress and egress along the path based on package location data from the location sensor sensing that the package has been transferred into or out of the room via the path.

A third aspect of the present invention concerns a shipping system configured to facilitate transfer of a package between a room in a building and a delivery vehicle outside the room associated with a shipment order. The shipping system is operable to selectively provide a path into and out of the room for package transfer. The shipping system broadly includes a shiftable panel assembly and a control system. The panel assembly is operable to be constructed as part of the building and includes a shiftable panel that is shiftable between open and closed positions to selectively provide access to the room. The control system is configured to facilitate transfer of a package between the room and the delivery vehicle and is configured to control the shiftable panel to selectively provide the path into and out of the room. The control system broadly includes a location sensor and a system processor. The location sensor is configured to sense package location data associated with the location of the package relative to the panel. The system processor is configured to receive package identification data associated with the package, permit panel opening to allow room ingress and egress along the path based on the package identification data, determine that the package has been transferred into or out of the room via the path based on package location data from the location sensor, and secure the panel closed to restrict room ingress and egress along the path based on package location data from the location sensor sensing that the package has been transferred into or out of the room via the path.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIGS. 5-10 are schematic views of the shipping system shown in FIGS. 1-4, showing steps of a package transfer process where a package is delivered to a building occupant;

FIGS. 16-21 are schematic views of a shipping system constructed in accordance with a third embodiment of the present invention, showing steps of a package transfer process where a package is delivered to a building occupant;

Figure 1:
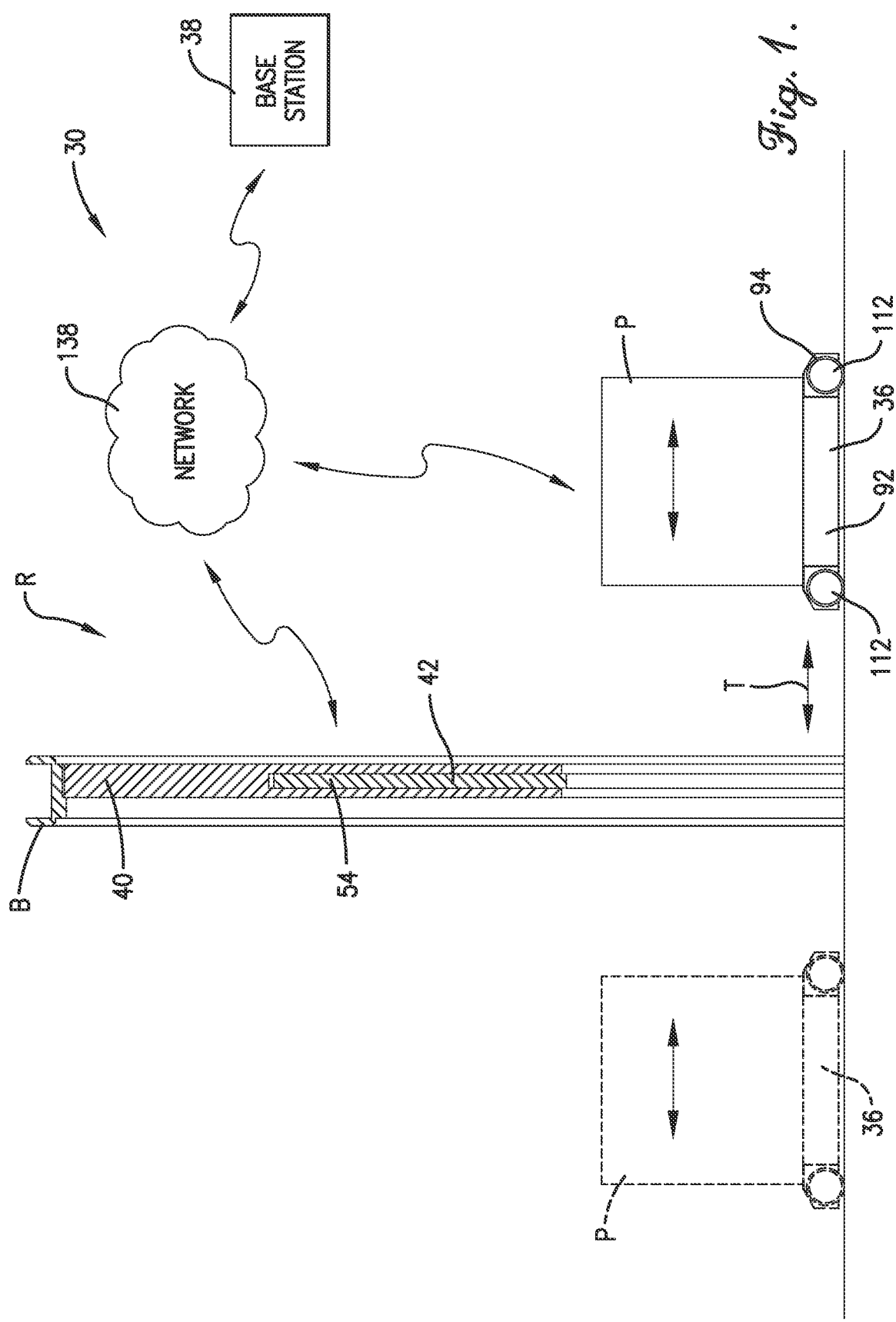
FIG. 1 is an elevational view of a shipping system constructed in accordance with a first preferred embodiment of the present invention, showing an autonomous vehicle, door, base station, and network of the shipping system provided as part of a building, with the vehicle being located in a room of the building.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Figure 2:
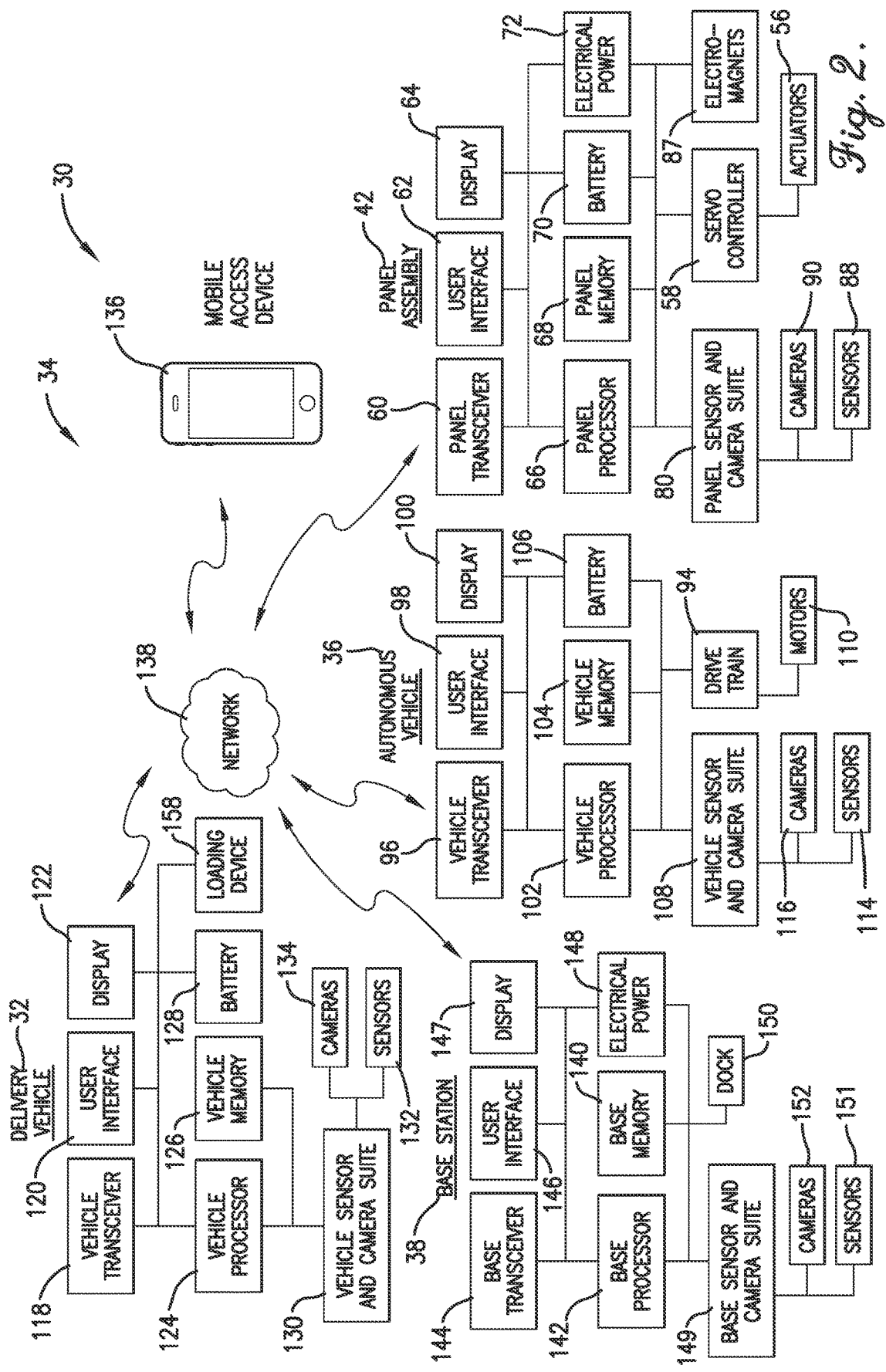
FIG. 2 is a schematic view of the shipping system shown in FIG. 1.

Turning initially to FIGS. 1 and 2, a shipping system 30 is constructed in accordance with a preferred embodiment of the present invention and is configured to facilitate transfer of a package P between a room R in a building B and a delivery vehicle 32 outside the room R associated with a shipment order. As will be described, the shipping system 30 includes a control system 34 for controlling a shiftable panel of the building B to selectively provide a path T (see FIGS. 6-8) into and out of the room R and an autonomous vehicle 36 configured to be advanced along the path to receive the package P. The shipping system 30 includes the autonomous vehicle 36, a base station 38, and a door 40.

The package P may have a package container to hold one or more delivery items. The package container may take various forms, such as an envelope, box, sack, can, tube, etc. Suitable packaging materials may include paper, cardboard, wood, synthetic resin material, and/or a metal material. The package P may include a plurality of items that are packaged together or separately packaged from one another.

The package identification data may be associated with the package P and provided in various forms, such as printed indicia (e.g., a barcode) and/or an RFID chip.

The depicted building B is preferably in the form of a single-family residential home. However, the principles of the present invention are equally applicable for use with other types of buildings, such as a multi-family residential complex or a commercial building having one or more commercial occupants. As will be shown in a subsequent embodiment, the building B may include a multi-occupant facility.

Shipping System

Turning to FIGS. 1-12, the door 40 preferably includes a powered panel assembly 42 to selectively provide a path T into and out of the room R for room ingress and egress. As described below, the panel assembly 42 facilitates transfer of the package P between the room R and the delivery vehicle 32 outside the room R associated with a shipment order.

Figure 3:
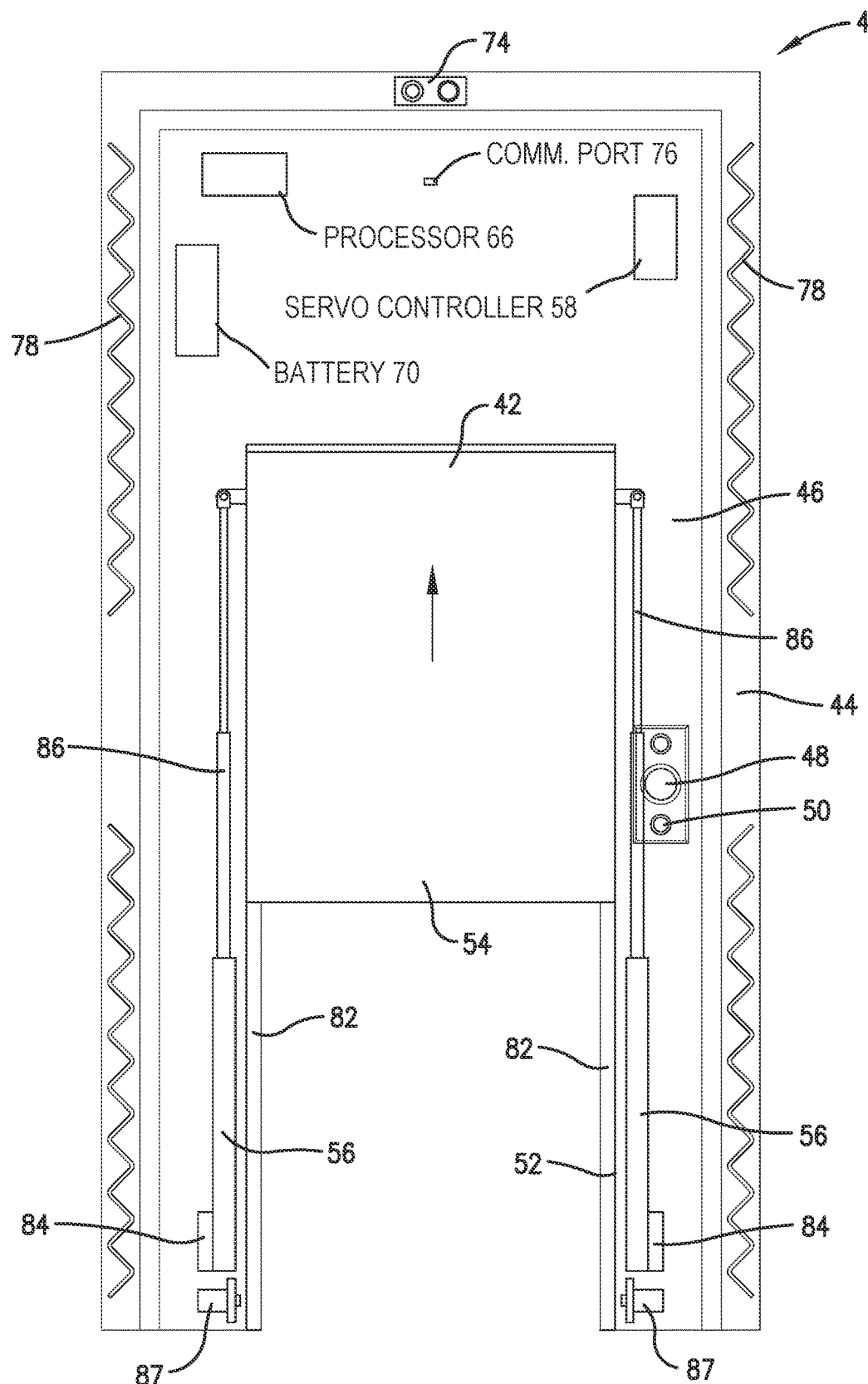
FIG. 3 is a front elevation of the door shown in FIG. 1, showing a panel assembly of the door in an open position to permit room ingress and egress.
Figure 4:
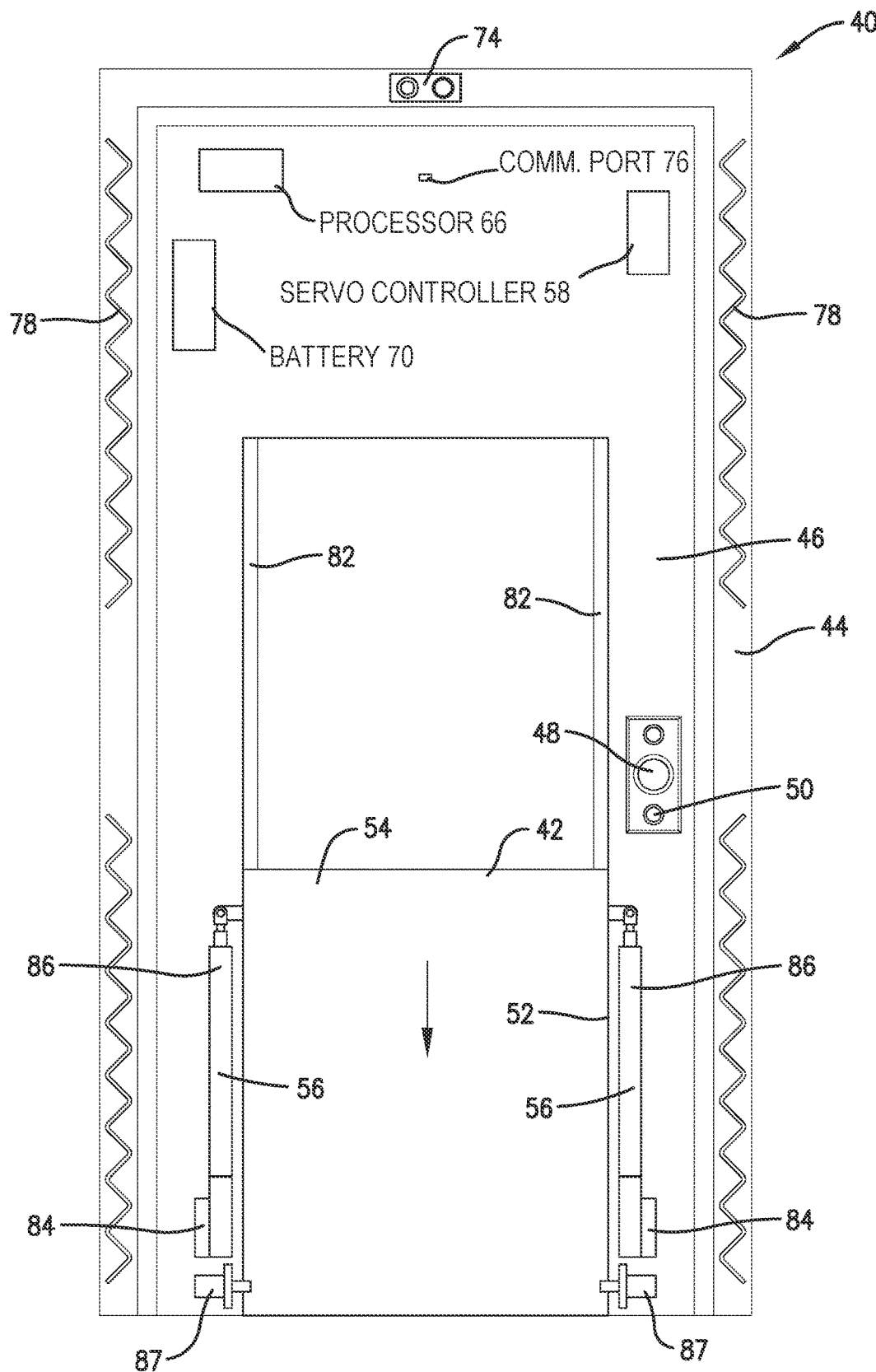
FIG. 4 is a front elevation of the door similar to FIG. 3, but showing the panel assembly of the door in a closed position to restrict room ingress and egress.

The door 40 broadly includes a door frame 44, a swingable door 46, and the panel assembly 42 (see FIGS. 3 and 4). In the usual manner, the swingable door 46 is swingably mounted to the door frame 44 and includes a door handle 48. The door handle 48 preferably includes a door lock 50, which may comprise a manual door lock or an electronic smart lock. In the usual manner, the swingable door 46 is configured to be opened and closed for room ingress and egress by a person. The swingable door 46 preferably presents a panel opening 52 to operably receive a shiftable panel 54 of the panel assembly 42.

The illustrated panel assembly 42 includes the shiftable panel 54, panel actuators 56, a servo controller 58, panel transceiver 60, user interface 62, display 64, processor 66, memory 68, battery 70, line power source 72, audio speaker and microphone assembly 74, communication port 76, antenna 78, and a sensor and camera suite 80 (see FIGS. 2-4).

The panel 54 is shiftably supported by guide rails 82 of the swingable door 46 and is shiftable between an open position, where the panel 54 is located above the panel opening 52, and a closed position, where the panel 54 spans the door opening 52.

The panel actuators 56 each preferably include a linear motor with an electric motor 84 and an extendable shaft 86 that is shiftable along a vertical direction to raise and lower the panel 54 between the open and closed positions. It is within the ambit of the present invention for the panel assembly to have an alternative actuator, such as an alternative linear motor (e.g., a hydraulic or pneumatic linear motor), or a drive motor other than a linear motor (e.g., an electric, hydraulic, or pneumatic motor with a rotating shaft). The panel actuators are configured to be operated by the servo controller 58, which may be operably connected to the actuators 56 via a wired or wireless connection. The panel assembly 42 also preferably includes electromagnets 87 that are configured to removably secure the panel 54 in the closed position.

The battery 70 is configured to supply power to other components of the door 40. The battery 70 preferably comprises a conventional rechargeable battery (such as a lithium ion battery) and may be integrated into the swingable door construction.

The audio speaker and microphone assembly 74 is configured to permit two-way communication between a room occupant and a delivery person outside the building B. The communication port 76, which may include a USB port, is configured to be removably operably connected with an electronic device (such as a portable computer, tablet, smart phone, etc.) outside the room R via a cable or other line (not shown). The communication port 76 is configured to provide data transfer between the system 30 and the electronic device.

The depicted sensor and camera suite 80 is operable to monitor various aspects of the system 30 and delivery service, particularly during the process of conducting a package transfer. The suite 80 includes sensors 88 and cameras 90. For instance, as will be described, one or more of the sensors 88 (such as a barcode scanner and/or an RFID scanner) and/or cameras 90 may be used to identify the package P and/or determine the location of the package P.

As used herein, the term "sensor" may include one or more of various types of sensors or cameras for sensing, collecting, and/or generating corresponding sensor data.

Although the panel assembly 42 is preferably integrated as part of the door, the panel assembly could be alternatively provided as part of the building B. For instance, the panel assembly may be integrated into an alternative exterior door. The panel assembly may also be integrated into an exterior wall of the building B.

The autonomous vehicle 36 is configured to receive and move the package P during the package transfer process (see FIGS. 5-10 and 12). The autonomous vehicle 36 preferably includes a chassis 92, a drive train 94, a transceiver 96, user interface 98, display 100, processor 102, memory 104, battery 106, and a sensor and camera suite 108 (see FIGS. 1 and 2).

The drive train 94 is operably supported by the chassis 92 and includes electric motors 110 to drive wheels 112.

The depicted sensor and camera suite 108 is operable to monitor various aspects of the system 30 and delivery service, particularly during the process of conducting a package transfer. The suite 108 includes sensors 114 and cameras 116. For instance, one or more sensors 114 (such as a barcode scanner and/or an RFID scanner) and/or cameras 116 may be used to identify the package P and/or determine the location of the package P.

The delivery vehicle 32 is configured to transfer the package P with a building occupant (by delivering the package to the occupant or receiving the package from the occupant). The delivery vehicle 32 preferably includes a commercial truck or van (not shown) configured to haul multiple packages. However, an alternative delivery vehicle may include an alternative wheeled vehicle (e.g., an automobile, motorcycle, scooter, moped, etc.) or a flying vehicle (e.g. a helicopter, drone, etc.) configured to transport one or more packages.

The delivery vehicle 32 preferably includes a chassis (not shown), drive train (not shown), transceiver 118, user interface 120, display 122, processor 124, memory 126, battery 128, and a sensor and camera suite 130 (see FIG. 2).

The depicted sensor and camera suite 130 is operable to monitor various aspects of the system 30 and delivery service, particularly during the process of conducting a package transfer. The suite 108 includes sensors 132 and cameras 134 (see FIG. 2). For instance, one or more sensors 132 (such as a barcode scanner and/or an RFID scanner) and/or cameras 134 may be used to identify the package P and/or determine the location of the package P.

Control System and Control Method

Referring to FIGS. 2 and 5-12, embodiments of a control system and a computer-implemented control method are shown for facilitating transfer of a package between a room in a building and a delivery vehicle outside the room associated with a shipment order.

The control system and computer-controlled control method may involve some or all of the elements and features described above or may involve substantially any suitable additional or alternative conventional or non-conventional technologies for accomplishing the processes described below. Further, while described in an example agricultural operating context, the control system and computer-implemented control method are not limited thereto and may be adapted for use in substantially any other suitable operating context.

An embodiment of the control system 34 is shown for facilitating the transfer of a package between a delivery service and a secure room. Broadly, the control system 34 may be configured to communicate with and/or control the delivery vehicle 32 in connection with a package transfer relative to the room R. In various embodiments, the autonomous vehicle 36 may autonomously receive and transfer the package P between the room R and the delivery vehicle 32, while maintaining periodic or continuous communication with the base station 38 and a mobile access device 136 via a wireless communications network 138.

Referring to FIG. 2, an embodiment of the base station 38 may include a base memory 140, a base processor 142, a base transceiver 144, an input interface 146, display 147, line power source 148, and base camera and sensor suite 149. The base station 38 may also include a vehicle dock 150 configured to have the autonomous vehicle 36 removably docked therewith. The base memory 140 may store a management computer program for initiating, monitoring, or otherwise managing operation of the delivery vehicle 32, door 40, and/or autonomous vehicle 36. The base memory 140 may also store operation instructions for a particular job, wherein the operation instructions may guide one or more operations of the delivery vehicle 32, door 40, and/or autonomous vehicle 36 during the particular job. The base processor 142 may execute the management computer program, including communicating the operation instructions to the delivery vehicle 32, door 40, and/or autonomous vehicle 36 via the base transceiver 144, and receiving sensor and/or camera data from the delivery vehicle 32, door 40, and/or autonomous vehicle 36 via the base transceiver 144.

The depicted sensor and camera suite 149 is operable to monitor various aspects of the system 30 and delivery service, particularly during the process of conducting a package transfer. The suite 149 includes sensors 151 and cameras 152 (see FIG. 2). For instance, one or more sensors 151 (such as a barcode scanner and/or an RFID scanner) and/or cameras 152 may be used to identify the package P and/or determine the location of the package P.

In at least one implementation, some or all operations of the delivery vehicle 32, door 40, and/or autonomous vehicle 36 may be controlled by the management computer program executed by the base processor 142, with control signals being transmitted from the base station 38 and sensor and/or camera data being received by the base station 38 via the communications network 138

In another implementation, some or all operations of the delivery vehicle 32, door 40, and/or autonomous vehicle 36 may be controlled by local computer programs executed by the processors of the delivery vehicle 32, door 40, and/or autonomous vehicle 36, based on operation instructions transmitted from the base station 38 and/or mobile access device 136. The local computer programs may be in periodic or continuous communication with the management computer program. The base transceiver 144 may facilitate bi-directional communication between the base station 38 and the delivery vehicle 32, door 40, and/or autonomous vehicle 36 via the communications network 138. The interface 146 may facilitate interaction by a user with the management computer program, including entry of the operation instructions. The interface 146 and/or display 147 may facilitate communication to the user of relevant information, including sensor and/or camera data from the delivery vehicle 32, door 40, and/or autonomous vehicle 36.

The base memory 140 may be an electronic memory storing operation instructions and other relevant information for access and use by the processor 142.

Figure 11:
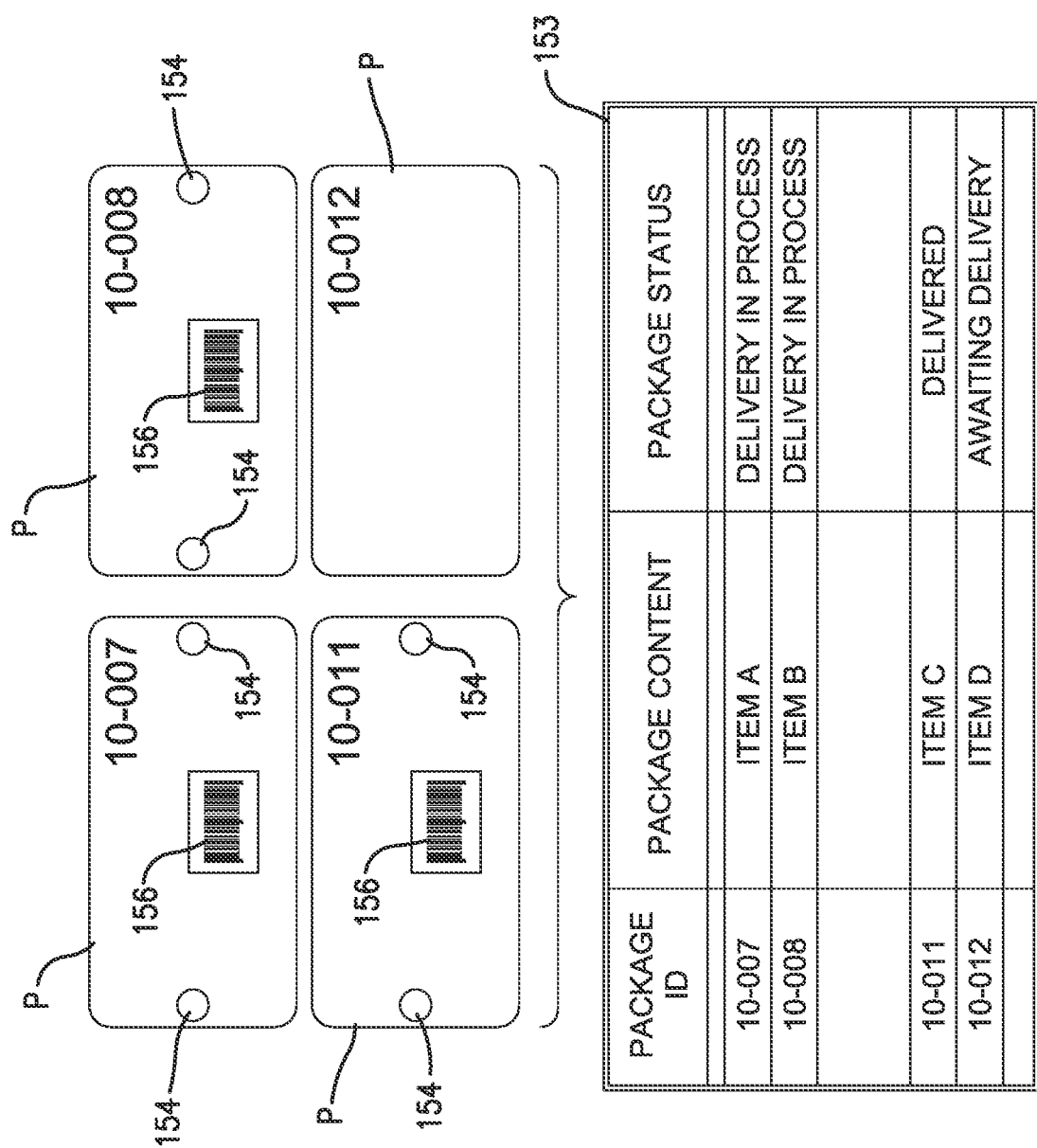
FIG. 11 is a schematic view of several packages for delivery by the shipping system and showing a corresponding data structure associated with the packages.

The base memory 140 may store a look-up table or other data structure 153 for one or more packages, which may include such information as an identifier, a location, a content, and a status for each package (see FIG. 11). Stored data may also include other information, such as item quantity contained in the package and/or a package weight.

The base station 38 preferably comprises a central computer, which may include various equipment, such as a desktop computer, server, portable computer, smartphone, tablet, etc.

The delivery vehicle 32 preferably provides elements of the control system 34, including the transceiver 118, user interface 120, display 122, processor 124, memory 126, battery 128, and the sensor and camera suite 130.

In at least one implementation, the delivery vehicle 32 may be a partially or fully autonomous vehicle, while in other implementations, the delivery vehicle may be a conventional manually driven vehicle or remotely driven vehicle.

The vehicle memory 126 may be an electronic memory storing operation instructions and other relevant information for access and use by the vehicle processor 124. The vehicle processor 124 may be an electronic processor executing one or more computer programs to control operation of the delivery vehicle 32, including autonomous travel to and from jobsites, aligning with the autonomous vehicle 36, and/or coupling and uncoupling with the autonomous vehicle 36. The vehicle transceiver 118 may facilitate bi-directional communication between the delivery vehicle 32 and the base station 38, panel assembly 42, and/or autonomous vehicle 36 via the communications network 138, including receiving operation instructions for the delivery vehicle 32.

The vehicle sensor and camera suite 130 may include one or more electronic sensors and/or cameras monitoring internal and/or external operations of the delivery vehicle 32 and facilitating accomplishment of the functions of the delivery vehicle 32. For instance, the delivery vehicle 32 may have any internal and/or external sensors 132 and/or cameras 134 desired or needed to accomplish autonomous travel to shipment delivery and/or shipment pickup locations. The delivery vehicle 32 may include one or more cameras providing images of the delivery vehicle 32, the door 40, and/or the autonomous vehicle 36, and/or an area around the delivery vehicle 32 during operation.

The delivery vehicle 32 may have one or more external sensors and/or cameras to facilitate relative positioning with the autonomous vehicle 36, such as position sensors to sense the position of the delivery vehicle 32. In one implementation, the delivery vehicle 32 may present one or more alignment markers (not shown) which the autonomous vehicle 36 senses and/or images for aligning itself with the delivery vehicle 32. The alignment markers may be passive, in that they reflect, e.g., light (e.g., visual, infrared, laser), wherein the light may be emitted by emitters on the autonomous vehicle 36, or the alignment markers may be active in that they emit, e.g., light.

The delivery vehicle 32 may have a delivery vehicle sensor configured to sense delivery vehicle location data associated with the location of the delivery vehicle 32 relative to the panel 54. For example, the delivery vehicle 32 may include a navigation sensor configured to sense and generate navigation data regarding a geographic location and/or a navigation camera to collect or generate the vehicle location data.

The processor 124 of the delivery vehicle 32 and/or another processor of the system 30 may be configured to have the delivery vehicle 32 move to a location adjacent the panel 54 to transfer the package between the delivery vehicle 32 and the room R, based on the delivery vehicle location data.

The delivery vehicle 32 may also include control and drive components, such as electrical, mechanical, and/or hydraulic controls for controlling operation of the delivery vehicle 32 in accordance with operation instructions, and motors and/or engines for accomplishing the functions of the delivery vehicle 32. This may include autonomous travel, aligning with the autonomous vehicle 36, and/or coupling and uncoupling with the autonomous vehicle 36, under the control of the vehicle processor 124 and vehicle control components.

The panel assembly 42 preferably provides elements of the control system 34, including the panel actuators 56, wireless servo controller 58, panel transceiver 60, user interface 62, display 64, processor 66, memory 68, battery 70, line power source 72, audio speaker and microphone assembly 74, communication port 76, antenna 78, and the sensor and camera suite 80. The door lock 50 may also be provided as part of the control system 34.

The panel memory 68 may be an electronic memory storing operation instructions and other relevant information for access and use by the processor 66.

The panel memory 66 may store a look-up table or other data structure 153 for one or more packages P, which may include such information as an identifier, a location, a content, and a status for each package (see FIG. 11). Stored data may also include other information, such as item quantity contained in the package and/or a package weight.

The panel processor 66 may be an electronic processor executing one or more computer programs to control operation of the panel assembly 42 and door lock 50. The panel transceiver 60 may be an electronic transceiver facilitating communications via the communications network 138, including receiving operation instructions for the panel assembly 42 and door lock 50.

The panel transceiver 60 may facilitate bi-directional communication between the panel assembly 42 and the base station 38, delivery vehicle 32, and/or autonomous vehicle 36 via the communications network 138, including receiving operation instructions for the panel assembly 42. In one implementation, the panel assembly 42 may use the panel transceiver 60 to communicate the status of one or more packages P and/or communicate other data associated with the packages P.

The panel sensor and camera suite 80 may include one or more electronic sensors 88 and/or cameras 90 monitoring operations of the panel assembly 42 and facilitating accomplishment of the functions of the panel assembly 42, including opening and closing of the panel 54.

The panel assembly 42 may include a sensor to sense whether the autonomous vehicle 36, the package P, and/or another item is positioned within the panel opening 52. The panel assembly 42 may have one or more cameras providing images of the area outside the building B (e.g., to provide images of the delivery person and/or the delivery vehicle 32), the room interior, and/or the autonomous vehicle 36.

The door 40 preferably comprises control and actuation components that may include electrical, mechanical, and/or hydraulic controls for controlling operation of the panel assembly 42 and/or the door lock 50 in accordance with the operation instructions, and electrical, mechanical, and/or hydraulic actuators for accomplishing the functions of the panel assembly 42 and/or door lock 50. For instance, the panel assembly 42 preferably includes actuators 56 and servo controller 58 to facilitate raising and lowering of the panel 54 between the open and closed positions. The door 40 may include a suitable actuator for locking and unlocking of the door lock 50.

The autonomous vehicle 36 preferably provides elements of the control system 34, including the transceiver 96, user interface 98, display 100, processor 102, memory 104, battery 106, and the sensor and camera suite 108.

In one implementation, the autonomous vehicle may be fully autonomous, while in other implementations, the autonomous vehicle may be at least sufficiently autonomous to accomplish the functionality described herein. The autonomous vehicle may be remotely drivable and/or its operations otherwise remotely controllable in case of emergency or other special circumstances.

The vehicle memory 104 may be an electronic memory storing operation instructions and other relevant information for access and use by the vehicle processor 102.

The vehicle processor 102 may be an electronic processor executing one or more computer programs to control operation of the vehicle 36, including moving into a package transfer position relative to the delivery vehicle 32, moving into a package transfer position relative to a delivery person, transferring one or more packages between the transfer position and a position in the room R, and/or other autonomous movement/travel, such as autonomous movement along an interior space (such as a room or hallway) or an exterior space (such as a porch, driveway, walkway, or street). The vehicle transceiver 96 may facilitate bi-directional communication between the autonomous vehicle 36 and the base station 38, delivery vehicle 32, and/or the panel assembly 42 via the communications network 138, including receiving operation instructions for the autonomous vehicle 36.

The vehicle sensor and camera suite 108 may include one or more electronic sensors 114 and/or cameras 116 monitoring operations of the autonomous vehicle 36 and facilitating accomplishment of the functions of the autonomous vehicle 36, including moving into the transfer position relative to the delivery vehicle 32, moving into the transfer position relative to the delivery person, transferring one or more packages between the transfer position and a position in the room R, autonomously advancing itself through the panel opening 52, and/or other autonomous movement/travel. In particular, the autonomous vehicle 36 may include any internal and/or external sensors and/or cameras desired or needed to accomplish autonomous movement along an interior space (such as a room or hallway) or an exterior space (such as a porch, driveway, walkway, or street).

The sensors 114 may include a speed sensor configured to sense and generate speed data regarding a speed of movement of the autonomous machine across the location; a weight sensor configured to sense and/or generate weight data regarding the weight(s) of the supported package(s), a motor and/or engine sensor configured to sense and generate motor performance, a navigation sensor configured to sense and generate navigation data regarding a geographic location of the autonomous vehicle 36, one or more cameras configured to provide images of the autonomous vehicle 36 in operation, and/or an area around the autonomous vehicle 36.

The vehicle processor 102 may accomplish moving and operating the autonomous vehicle 36 at the building location in accordance with the set of operation instructions based at least in part on the speed, weight, motor, navigation, camera, and any other sensor and/or camera data.

The autonomous vehicle 36 may have external sensors and/or cameras to facilitate alignment with the delivery vehicle 32 (such as alignment sensors to sense alignment markers on the delivery vehicle) or to facilitate coupling and uncoupling with the delivery vehicle 32.

In particular, the autonomous vehicle 36 may have external sensors and/or cameras to facilitate the transfer of packages, such as alignment sensors to sense whether the autonomous vehicle 36 is properly aligned with the delivery vehicle 32. The external sensors and/or camera suite 108 may sense or provide images of the autonomous vehicle 36, delivery vehicle 32, and/or packages to facilitate coupling and uncoupling with the delivery vehicle and/or identifying and transferring packages.

Similarly, the autonomous vehicle 36 may have external sensors and/or cameras to facilitate coupling and uncoupling with the vehicle dock 150 of the base station 38. The external sensors and/or camera suite 108 may sense or provide images of the dock 150 and/or the autonomous vehicle 36 to facilitate coupling and uncoupling with the vehicle dock 150.

In one implementation, the autonomous vehicle 36 may include an alignment sensor configured to sense and generate alignment data regarding a relative position of the delivery vehicle 32, package(s) P, panel assembly 42, and/or dock 150. The delivery vehicle 32, package(s) P, panel assembly 42, and/or dock 150 may present one or more alignment markers 154 (see, e.g., FIG. 11) which the docking alignment sensor senses or images and uses to align itself therewith (e.g., during coupling or uncoupling).

The alignment markers 154 may be passive, in that they reflect, e.g., light (e.g., visual, infrared, laser), wherein the light may be initially emitted by emitters on the autonomous vehicle 36, or the alignment markers 154 may be active in that they emit, e.g., light. The processor 102 may align the autonomous vehicle 36 with the delivery vehicle 32, package(s) P, panel assembly 42, and/or dock 150 based on the alignment data from the alignment sensor. For instance, the machine processor 102 may align the autonomous vehicle 36 with the delivery vehicle 32 and facilitate transfer of a particular package between the delivery vehicle 32 and the autonomous vehicle 36.

The locations, contents, and statuses of packages may be provided in a look-up table or other data structure 153 stored in a memory of the system 30 (such as vehicle memory 104), and the processor 102 may refer to such data to identify the location of package for transfer. Additionally or alternatively, a package identification indicia or data for each package may be indicated by a bar code or other machine readable label 156 (see FIG. 11) on an exterior package surface, and the autonomous vehicle 36 may sense and/or image the label to determine or confirm the identity of the package.

The autonomous vehicle 36 may have control and drive components, such as electrical, mechanical, and/or hydraulic controls for controlling operation of the autonomous vehicle 36 in accordance with operation instructions, and motors and/or engines for accomplishing the functions of the autonomous vehicle 36, including autonomous movement along or adjacent to the transfer location (and, in some implementations, autonomous travel to and from the transfer location), aligning with the delivery vehicle 32, panel assembly 42, or dock 150, coupling and uncoupling with the delivery vehicle 32, and coupling and uncoupling with the dock 150, under the control of the processor 102 and the control components.

The mobile access device 136 may provide supplementary input and output interfaces for entering operation instructions and communicating sensor and/or camera data from the delivery vehicle 32, autonomous vehicle 36, base station 38, and/or panel assembly 42. The mobile access device 136 may be a smartphone, tablet, portable computer, or substantially any other suitable conventional or non-conventional technology. The mobile access device 136 may be used by the building occupant and/or the delivery person.

The communications network 138 may be substantially any suitable network employing substantially any suitable communications technology.

The control system 34 may include more, fewer, or alternative components and/or perform more, fewer, or alternative actions, including those discussed elsewhere herein, and particularly those discussed in the below-described computer-implemented control method.

Referring to FIGS. 5-10 and 12, an embodiment of a control method 200 is shown for facilitating delivery of one or more packages, including aligning and/or coupling the autonomous vehicle 36 relative to a delivery vehicle, and including transferring the package between the autonomous vehicle and the delivery vehicle. The control method 200 may be a corollary to the functionality of the above-described control system 34, and may be implemented using the various components of the control system 34 within the above-described example operating environment or other context. Broadly, the control method 200 may proceed substantially as follows. Some or all of the steps may be accomplished under partial or full computer control.

Operation instructions may be initially provided for at least the autonomous vehicle 36. The room occupant and/or delivery person may enter the operation instructions, and the operation instructions may be any relevant instructions, such as a start time, pause, end time, speed of movement, etc. Operation instructions may include whether or not the autonomous vehicle 36 is used to facilitate transfer of a package. Operation instructions may include whether the autonomous vehicle 36 is positioned in a transfer location outside the building B or within the room R (e.g., in a location adjacent the panel assembly) for transfer of a package. Relevant operation instructions may be similarly entered for the panel assembly 42 and/or the delivery vehicle 32.

The operation instructions may be entered at the transfer location, at the base station 38, or any other location. The operation instructions may be entered using the interface 146 or substantially any other suitable input interface. The operation instructions may be individually entered or selected from the base memory 140 or the vehicle memory 104 as a subset or full set of prior-entered operation instructions, which may modified, as desired or needed.

It will be appreciated that the control methods described herein may be used in connection with an incoming delivery process, where package(s) are delivered from a shipper (such as a supplier) at another location, via the delivery vehicle, to a person (i.e., a recipient) in the building B, and/or an outgoing delivery process, where package(s) are delivered from a person in the building B (i.e., a shipper), via the delivery vehicle, to a recipient at another location.

The system 30 may be activated to initiate and conduct a package transfer, as shown in 202. In one implementation, the delivery person or delivery vehicle may provide package identification data to the system 30 (e.g., by sending data to the base station) as part of the process to initiate a package transfer. For instance, the delivery person may manually input the data through a device (see FIG. 5). Similarly, the delivery person may position a package adjacent the door 40 so that a sensor (e.g., barcode scanner, RFID reader, etc.) and/or camera of the system 30 may collect sensor and/or camera data from the package.

The base station 38, autonomous vehicle 36, panel assembly 42, delivery vehicle 32, and/or another device associated with the delivery service may provide the sensor and/or camera used to collect the package identification data. The sensor and/or camera data may be collected from a barcode, RFID chip, or other identifying element that includes the package identifying data and is supplied with the package.

The sensor and/or camera data may be transmitted from the autonomous vehicle 36, panel assembly 42, delivery vehicle 32, and/or another device, via its corresponding transceiver, through the network 138, to the transceiver 144 of the base station 38. In this manner, the transceiver 144 of the base station 38 may be configured to receive package identification data associated with the package P and/or other data associated with package transfer.

The system 30 may then compare the package identifying data with a stored identifier to confirm that the package P corresponds with a shipment order. A processor of the system 30, such as the base processor 142, is operable to receive package identification data associated with the package P.

In particular, a processor of the system 30 is configured to access a data structure (such as data structure 152) containing an identifier for the package P. The identifier is generated in connection with creation of a shipment order. The system processor is configured to compare the identifier and the sensed package identification data to confirm a match, indicating the package corresponds with the shipment.

The system processor is also configured to open the panel 54 to allow room ingress and egress based upon confirmation that the identifier and package identification data match one another.

The system processor is also configured to have the autonomous vehicle 36 moved based upon confirmation that the identifier and package identification data match one another.

In another implementation, a package transfer may be initiated when the system 30 senses the presence of the delivery person or delivery vehicle 32. In another implementation, a package transfer may be initiated when the system 30 communicates with the delivery person or delivery vehicle 32. In another implementation, a package transfer may be initiated when an occupant of the building B manually authorizes the system 30 to begin a package transfer.

In another implementation, package location data associated with the location of the package relative to the panel may be provided to the system 30.

For instance, the autonomous vehicle 36, panel assembly 42, delivery vehicle 32, or another device associated with the delivery service may include a location sensor (e.g., a navigation sensor configured to sense and generate navigation data regarding a geographic location and/or camera) used to collect or generate the package location data, which may be sent to another part of the system 30 (e.g., by sending data to the base station). It will also be appreciated that package location data may be collected by the system 30 as part of the process to initiate a package transfer. For instance, the delivery person may position a package adjacent the door 40 so that a sensor (e.g., barcode scanner, RFID reader, etc.) and/or camera of the panel assembly 42 may collect sensor and/or camera data associated with a package location in proximity to the door 40.

The package location data provided by the sensor and/or camera data may be transmitted from the autonomous vehicle 36, panel assembly 42, delivery vehicle 32, or another device (such as a portable computer, tablet, smartphone, etc.), via its corresponding transceiver, through the network 138, to the transceiver 144 of the base station 38. For instance, package location data may be transmitted from a transceiver associated with the delivery vehicle 32, through the network 138, to the transceiver 144 of the base station 38. In this manner, the transceiver 144 of the base station 38 may be configured to receive package location data associated with the package P.

In various embodiments, the delivery vehicle 32 may have a powered loading device 158 (see FIG. 2) configured to transfer the package P into or out of the delivery vehicle 32. The loading device 158 may be operable to transfer the package to or from a transfer location adjacent the building (e.g., a porch, walkway, driveway, street, etc.). The loading device 158 may be operable to transfer the package to or from the autonomous vehicle 36. A system processor may be configured to have the autonomous vehicle 36 moved into the transfer location, which may be adjacent the delivery vehicle 32, to transfer the package between the autonomous vehicle and the delivery vehicle, based on the vehicle location data.

If the package identifier does not match the collected package identification data, the system 30 is configured to keep the panel closed, as shown in 204.

Figure 12:
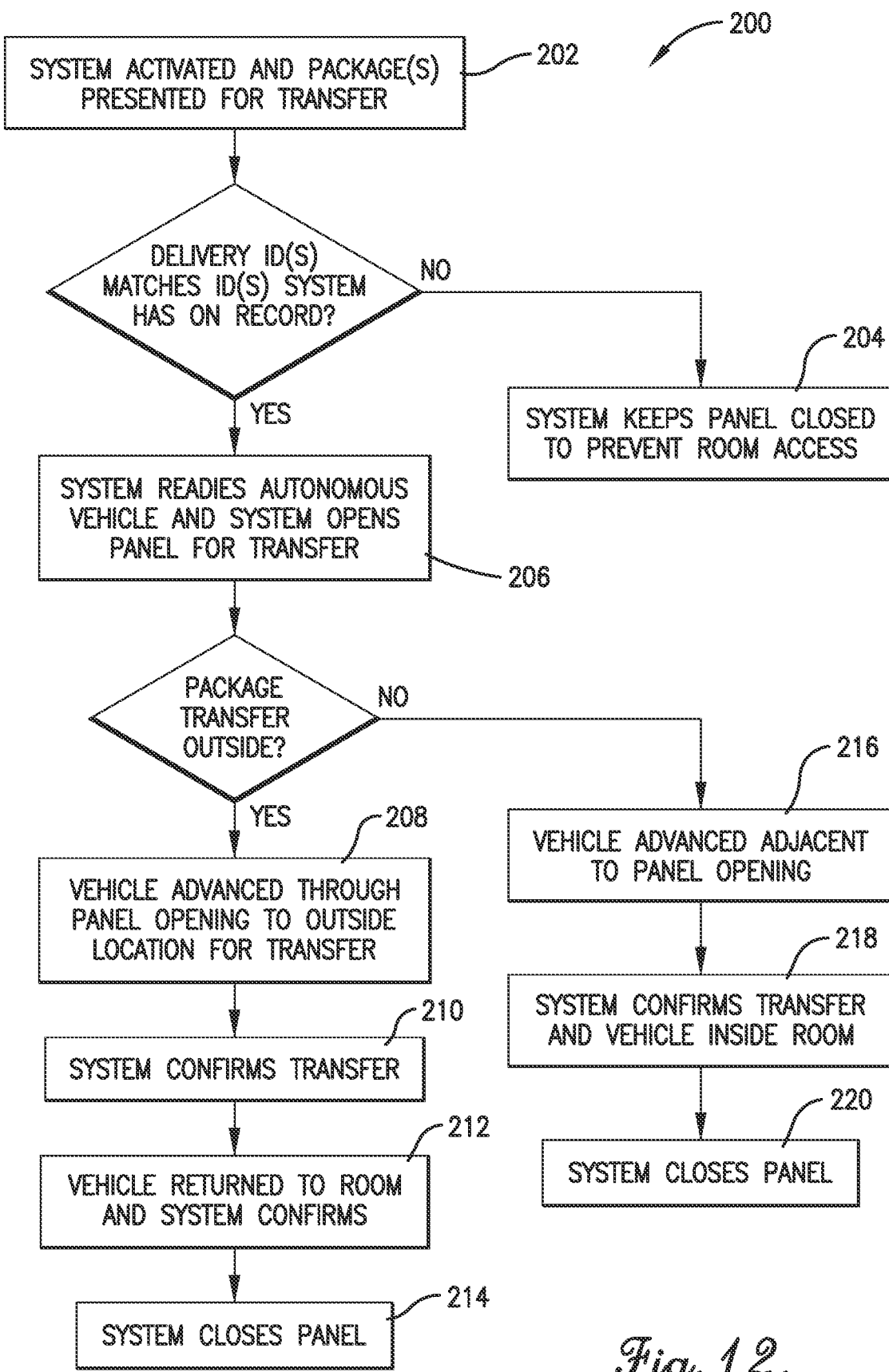
FIG. 12 is a schematic diagram of a control method of the shipping system shown in FIGS. 1-11.

If the package identifier matches the collected package identification data, the system 30 may have the panel assembly 42 open the panel 54 to permit room ingress and egress via the panel opening, as shown in 206 (see FIGS. 6 and 12). In particular, the system 30 may operate the actuators to raise the panel 54 from the closed position. In the closed position, the panel 54 is preferably secured to restrict room ingress and egress along the path T. The system 30 may stop the actuators 56 when sensor data and/or camera data confirm that the panel 54 is in the open position.

Although the panel assembly 42 is preferably configured so that the panel 54 is driven by actuators 56 between open and closed positions, the panel assembly may be alternatively configured within the scope of the present invention. An alternative panel assembly may have a panel shiftable between open and closed positions without the use of an actuator.

For instance, an alternative panel assembly may have a panel swingably supported along an upper margin that permits the panel to normally return to a closed position. In such an embodiment, the panel assembly may include a panel lock device that shifts between a locked condition, in which the panel is secured in the closed position, and an unlocked condition, in which the panel is unlocked and permitted to shift open to allow room ingress and egress along the path.

If the package identifier matches the collected package identification data, the system 30 may ready the autonomous vehicle for package transfer, see 206. For instance, if the autonomous vehicle is docked with the dock, the system 30 may have the autonomous vehicle 36 uncouple itself from the dock 150. The system 30 may have the autonomous vehicle 32 advance itself to a ready position adjacent the panel 54, where the autonomous vehicle 36 is preferably aligned with the panel opening 52.

The system 30 is configured to have the autonomous vehicle 36 align itself with the panel opening 52, another element of the panel assembly 42, and/or another element of the door 40 via alignment markers (not shown) positioned on the panel assembly 42 or another part of the door 40.

In one implementation, with the autonomous vehicle 36 in the ready position and the panel 54 opened, the autonomous vehicle 36 may be configured to receive a package or have a package removed therefrom.

In another implementation, with the autonomous vehicle 36 in the ready position and the panel 54 opened, the autonomous vehicle 36 may be configured to be advanced through the panel opening 52 for room egress to receive a package or to have a package removed.

Again, operation instructions may include whether a transfer location for the autonomous vehicle is outside the building B or within the room R. For instance, the transfer location may be outside the building B (e.g., on a porch, walkway, driveway, street, etc. adjacent the building) for receiving the package from a delivery service or providing a package for pickup by the delivery service.

Vehicle location data associated with the location of the autonomous vehicle 36 relative to the panel 54 may be provided to the system 30.

The base station 38, autonomous vehicle 36, and/or panel assembly 42, may include a sensor and/or camera used to collect vehicle location data, which may be sent to another part of the system 30 (e.g., by sending data to the base station 38). For example, the autonomous vehicle 36 may include a sensor (e.g., a navigation sensor configured to sense and generate navigation data regarding a geographic location and/or navigation camera) used to collect or generate the vehicle location data.

It will also be appreciated that package location data may be collected by the system 30 as part of the process to initiate a package transfer. For instance, the delivery person may position a package adjacent the door 40 so that a sensor (e.g., barcode scanner, RFID reader, etc.) and/or camera of the panel assembly 42 may collect sensor and/or camera data associated with a package location in proximity to the door 40.

The package location data provided by the sensor and/or camera data may be transmitted from the autonomous vehicle 36, panel assembly 42, delivery vehicle 32, or other device, via its corresponding transceiver, through the network 138, to the transceiver 144 of the base station 38. In this manner, the transceiver 144 may be configured to receive vehicle location data associated with the vehicle 36.

Package transfer data may be associated with the removal of a package P from the autonomous vehicle 36 (e.g., where the package is removed from a position supported on the vehicle or is otherwise detached or uncoupled from the vehicle 36). Similarly, package transfer data may be associated with the receipt of a package by the autonomous vehicle 36 (e.g., where the vehicle 36 supports or is otherwise connected or coupled with the package P).

The base station 38, autonomous vehicle 36, delivery vehicle 32, and/or panel assembly 42, may include a sensor and/or camera used to collect package transfer data, which may be sent to another part of the system 30 (e.g., where data is sent to the base station 38).

For example, the autonomous vehicle 36 may include a weight sensor configured to indicate a change in weight supported by the autonomous vehicle 36. In another implementation, package transfer data may be provided by sensor data (such as data from a proximity sensor) and/or camera data from the system 30 indicating an addition or removal of a package supported by or coupled relative to the autonomous vehicle 36. Associated sensor or camera data may be provided by the delivery vehicle 32, autonomous vehicle 36, panel assembly 42, and/or base station 38. In another implementation, package transfer data may be generated by manual input to a user interface of the system 30 by the delivery driver and/or a building occupant.

It will also be appreciated that package transfer data may be collected by the system 30 as part of the process to initiate a package transfer. For instance, the building occupant may position a package on the autonomous vehicle 36 so that a sensor and/or camera of the system 30 may collect sensor and/or camera data associated with package receipt on the vehicle 36.

The package transfer data provided by the sensor and/or camera data may be transmitted from the autonomous vehicle 36, panel assembly 42, delivery vehicle 32, or other device, via its corresponding transceiver, through the network 138, to the transceiver 144 of the base station 38. In this manner, the transceiver 144 may be configured to receive package transfer data associated with the package P.

If the transfer location is outside the building B, the autonomous vehicle is advanced through the panel opening 52 to the transfer location for the package transfer, as shown in 208 (see FIGS. 6 and 12). At the transfer location, the system 30 confirms that the package transfer is completed. The transfer location outside the building B may be adjacent the panel assembly 42 to receive the package.

In one implementation, package transfer completion may be confirmed, as shown in 210, by sensor data from a package transfer sensor of the system 30 configured to sense removal of the package from the autonomous vehicle 36 (e.g., where the package is removed from a position supported on the vehicle or is otherwise detached or uncoupled from the vehicle). Package transfer completion may also be confirmed by sensor data from a package transfer sensor of the system 30 configured to sense receipt of the package by the autonomous vehicle 36 (e.g., where the vehicle supports or is otherwise connected with the package).

After room egress of the autonomous vehicle 36 and while the vehicle 36 remains outside the building B, the system 30 may have the panel 54 remain open. However, for at least some embodiments of the present invention, the system 30 may have the panel 54 return to the closed position for this period.

Subsequent to confirmation of package transfer in 210, the system 30 has the autonomous vehicle returned to the room R by advancing the autonomous vehicle through the panel opening and into the room R, as shown in 212 (see FIGS. 9 and 12). In one implementation, the system 30 may sense the autonomous vehicle 36 to confirm the vehicle is inside the room R. Vehicle return may be confirmed by sensor data (e.g., from a barcode scanner or an RFID reader) and/or camera data from the system 30. Sensor or camera data confirming the vehicle location in the room R may be provided by the delivery vehicle 32, autonomous vehicle 36, panel assembly 42, base station 38, and/or another device.

In another implementation, where the package P is being received by the building occupant, the system 30 may sense the package to confirm the vehicle 36 and package are both inside the room R. Package location in the room R may be confirmed by sensor data (e.g., from a barcode scanner or an RFID reader) and/or camera data from the system 30.

Based upon a determination that the package has been transferred into or out of the room R via the path T and/or based upon confirmation of the vehicle being returned to the room R, the system 30 may have the panel assembly 42 secure the panel 54 closed to restrict room ingress and egress via the panel opening 52, as shown in 214 (see FIGS. 10 and 12).

For instance, the system 30 may operate the actuators 56 to lower the panel 54 from the open position to the closed position and secure the panel closed. The system 30 may stop the actuators 56 when sensor data and/or camera data confirm that the panel 54 is in the closed position. The system 30 may prevent the actuators 56 from lowering the panel 54 if sensor data and/or camera data identify an obstruction extending through, across, or adjacent the panel opening.

As noted above, an alternative panel assembly may have a panel that is alternatively shiftable between open and closed positions and/or is alternatively secured in the open and closed positions. For example, the panel assembly may include a panel lock device that shifts between a locked condition, in which the panel is secured in the closed position to restrict room ingress and egress, and an unlocked condition, in which the panel is unlocked and permitted to shift open to allow room ingress and egress along the path.

If the transfer location is inside the building B, the autonomous vehicle 36 may be advanced to a transfer location adjacent the panel 54 for the package transfer, as shown in 216. At the transfer location, the system 30 confirms that the package transfer is completed, see 218. Package transfer completion may be confirmed by sensor data from the system 30, as discussed above.

Upon confirmation of package transfer completion, the system 30 may have the panel assembly 42 close the panel 54 to restrict room ingress and egress via the panel opening 52, as shown in 220 (see FIG. 12). In particular, the system 30 may operate the actuators 56 to lower the panel 54. The system 30 may stop the actuators 56 when sensor data and/or camera data confirm that the panel 54 is in the open position. Again, the system 30 may prevent the actuators 56 from lowering the panel 54 if sensor data and/or camera data identify an obstruction extending through, across, or adjacent the panel opening.

For some embodiments of the present invention, a package transfer may be conducted without using an autonomous vehicle, such as the autonomous vehicle 36. For example, if the package identifier matches the collected package identification data, the system 30 may have the panel assembly 42 open the panel 54 to permit room ingress and egress via the panel opening 52. In particular, the system 30 may operate the actuators 56 to raise the panel 54. Again, the system 30 may stop the actuators 56 when sensor data and/or camera data confirm that the panel 54 is in the open position.

To transfer the package without use of an autonomous vehicle, it will be appreciated that the package P may be advanced through the panel opening 52 to a transfer location in the room R by various means. For instance, the package P may be advanced manually through the panel opening 52 by a delivery driver. The package P may also be advanced using a powered device (e.g., a vehicle, conveyor, etc.) or a manually operated device, which may or may not communicate with the system 30.

With the transfer location being inside the building B, the system 30 confirms that the package transfer is completed. Package transfer completion may be confirmed by sensor data from the system 30, as discussed above.

Upon confirmation of package transfer completion, the system 30 may have the panel assembly 42 close the panel 54 to restrict room ingress and egress via the panel opening 52. As described above, the system 30 may operate the actuators to lower the panel 54. The system 30 may stop the actuators when sensor data and/or camera data confirm that the panel is in the open position. The system 30 may prevent the actuators from lowering the panel if sensor data and/or camera data identify an obstruction extending through, across, or adjacent the panel opening.

Alternative Embodiments

Figure 13:
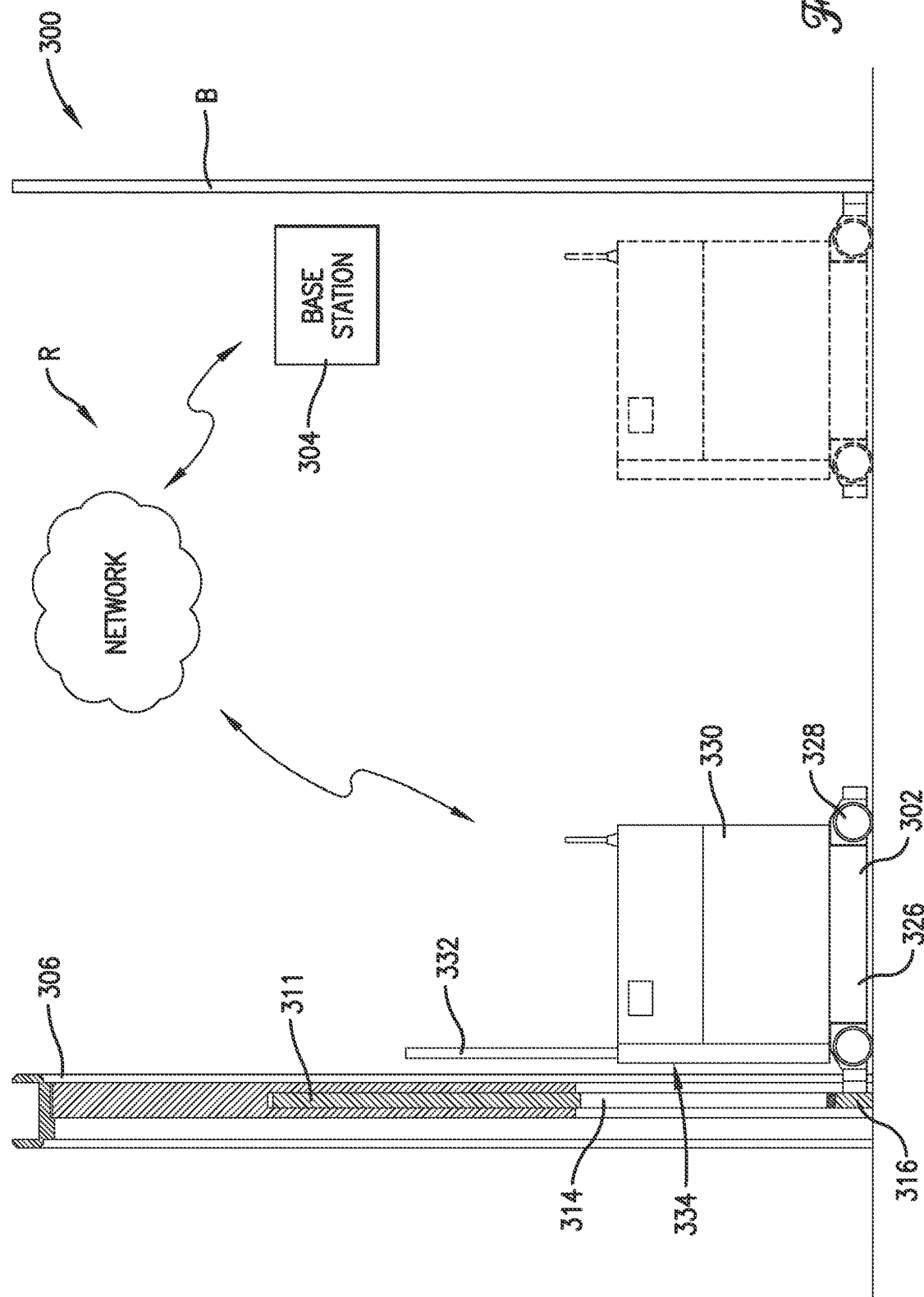
FIG. 13 is an elevational view of a shipping system constructed in accordance with a second embodiment of the present invention, showing an autonomous vehicle, door, base station, and network of the shipping system provided as part of a building, with the vehicle being located in a room of the building.
Figure 14:
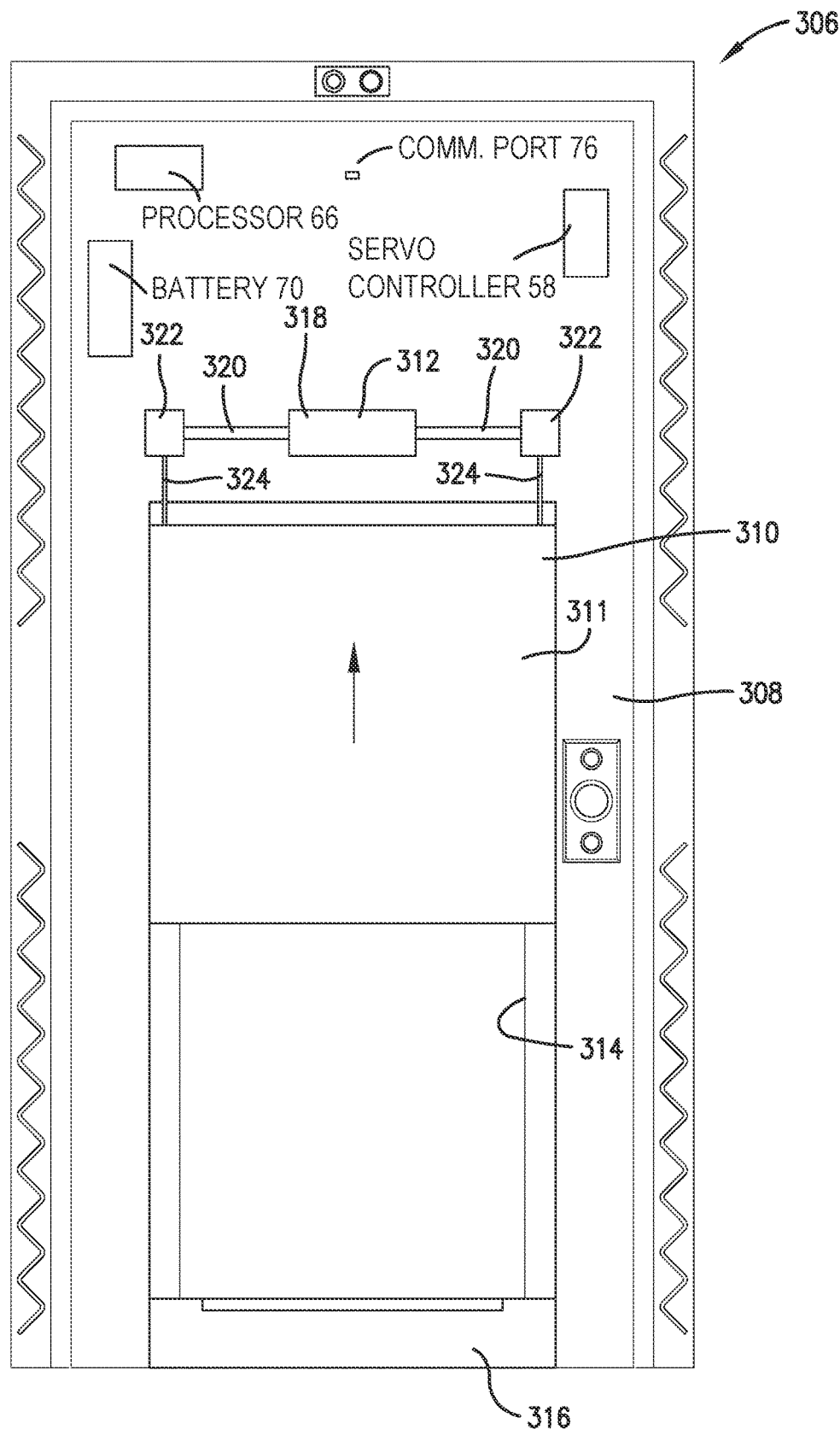
FIG. 14 is a front elevation of the door shown in FIG. 13, showing a panel assembly of the door in an open position to permit room ingress and egress.
Figure 15:
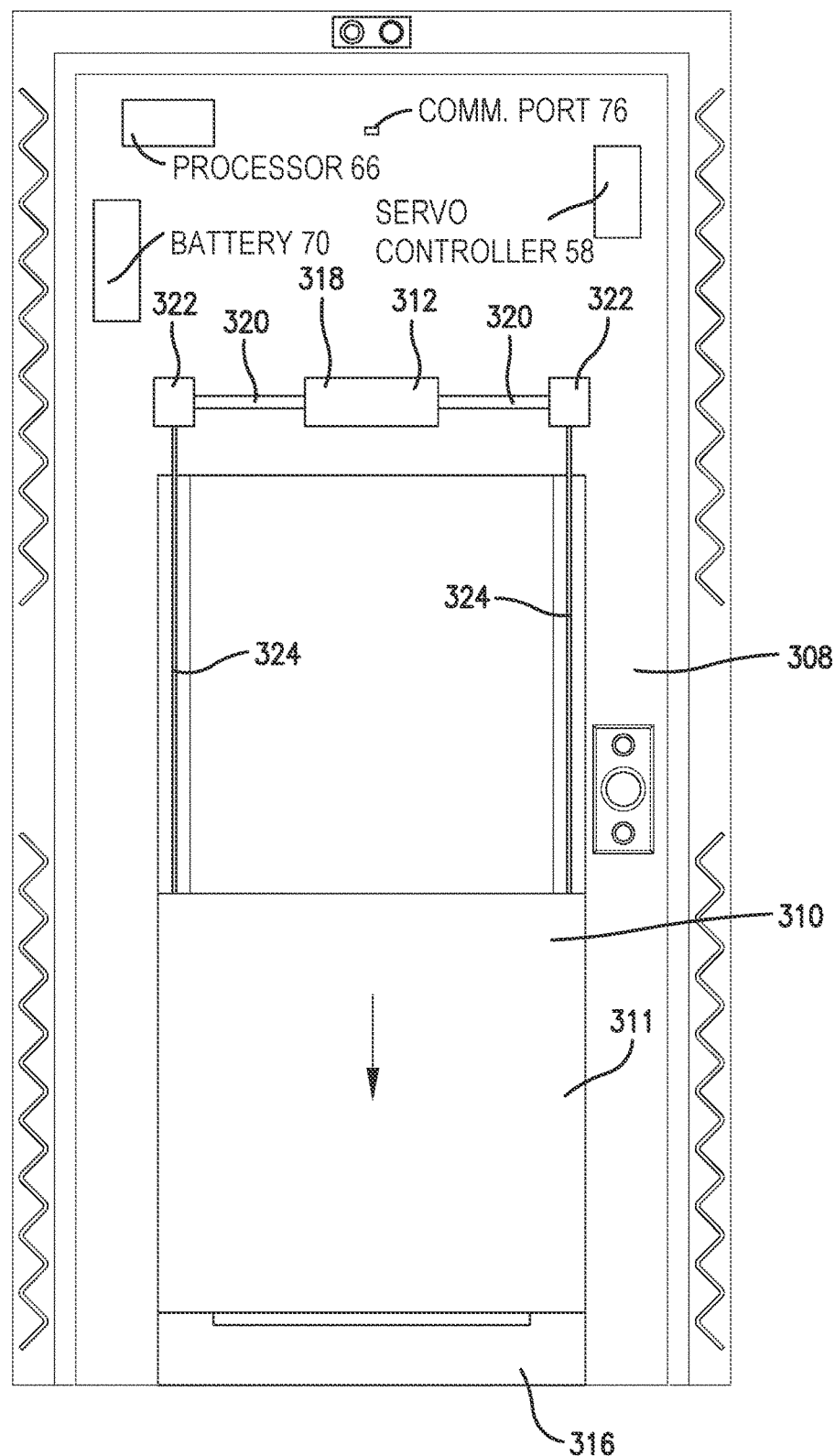
FIG. 15 is a front elevation of the door similar to FIG. 14, but showing the panel assembly of the door in a closed position to restrict room ingress and egress.

Turning to FIGS. 13-15, an alternative system 300 is constructed in accordance with a second embodiment of the present invention. The following description of system 300 will primarily describe differences of the system 300 compared to the system 30.

The alternative system 300 includes, among other things, an alternative autonomous vehicle 302, a base station 304, and an alternative door 306.

The door 306 preferably includes an alternative swingable door 308 and a powered panel assembly 310. The panel assembly 310 has an alternative shiftable panel 311 and an alternative panel actuator 312. The door 308 presents a panel opening 314 that permits room ingress and egress when the panel 310 is opened. The door 308 preferably includes a lowermost door rail 316 that defines a lower margin of the panel opening 314. The door rail 316 preferably restricts the vehicle 302 from driving through the panel opening 314, whether the panel opening 314 is opened or closed. In this manner, the door 306 is configured to restrict the vehicle 302 from room egress while permitting package transfer through the panel opening 314.

The panel actuator 312 includes an electric motor 318, a shaft 320, opposite pulleys 322 mounted on the shaft 320, and lines 324 attached to the pulleys 322 to raise and lower the panel 310.

The autonomous vehicle 302 is configured to receive and move a package P during the package transfer process. The autonomous vehicle 36 preferably includes a chassis 326, a drive train 328, and a temperature-controlled enclosure 330 supported on the chassis 326.

The enclosure 330 preferably includes an enclosure cover 332 that can be raised and lowered between open and closed positions to provide selective access to an enclosure chamber 334. The enclosure 330 preferably includes a heating and cooling device (not shown) configured to maintain the chamber 334, along with a package(s) therein, at a temperature higher or lower than room temperature.

The heating and cooling device is operably coupled to the vehicle processor and battery. Thus, the vehicle processor is configured to control heating and cooling of the chamber 334 and package(s).

Turning to FIGS. 16-23, an alternative system 400 is constructed in accordance with a third embodiment of the present invention. The following description of system 400 will primarily describe differences of the system 400 compared to the system 30.

The alternative system 400 includes, among other things, an alternative autonomous vehicle 402, an alternative delivery vehicle 404, and a door 406.

The autonomous vehicle 402 is configured to receive and move a package P during the package transfer process. The autonomous vehicle 406 preferably includes a chassis 408, a drive train 410, and an enclosure 412 supported on the chassis 408.

Figure 19:
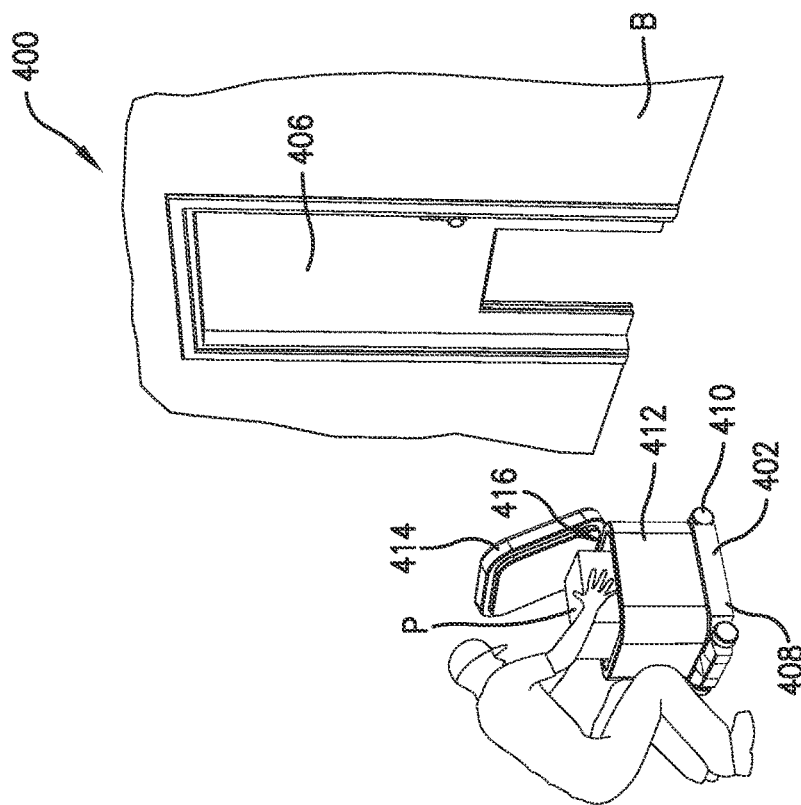
Figure 18:
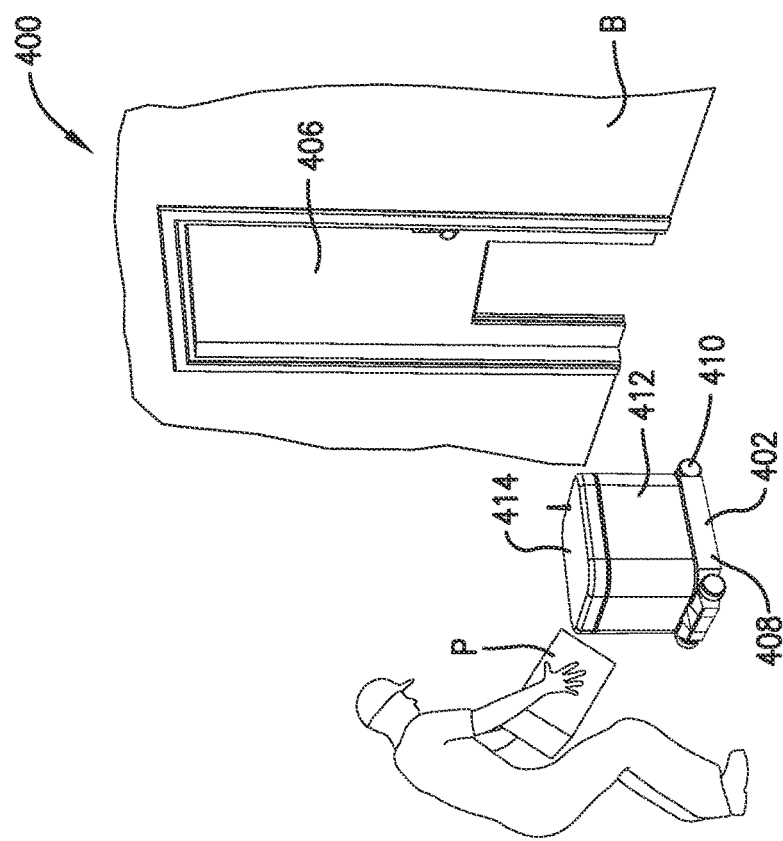
Figure 23:
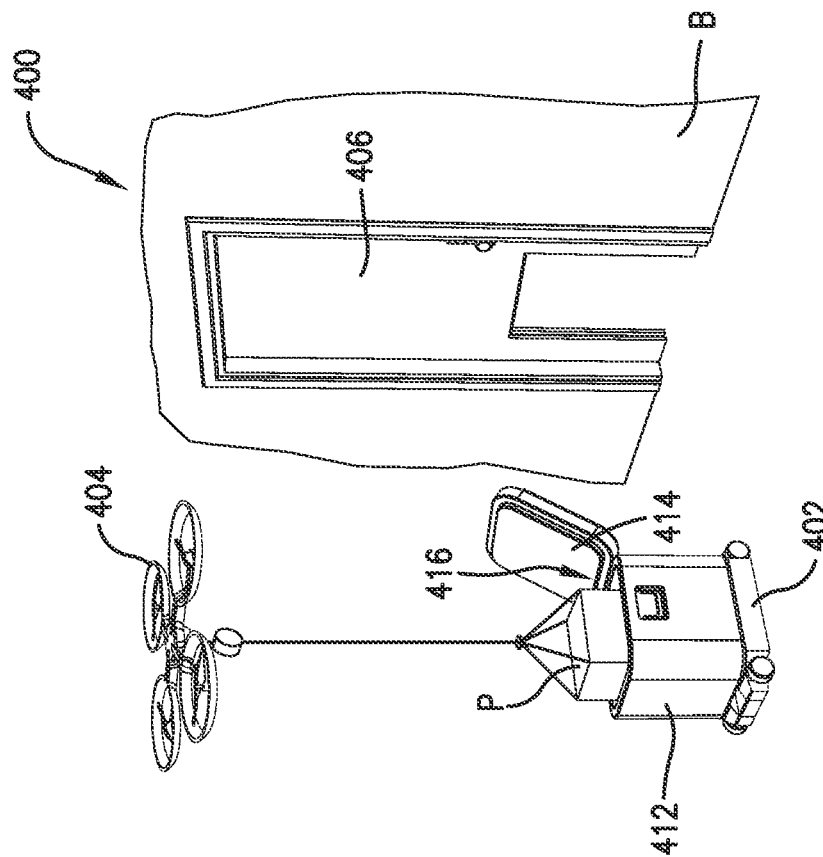
FIGS. 22 and 23 are schematic views of the shipping system similar to FIGS. 16-21, but showing an alternative delivery vehicle in the form of a flying drone used to transfer a package to the autonomous vehicle.
Figure 22:
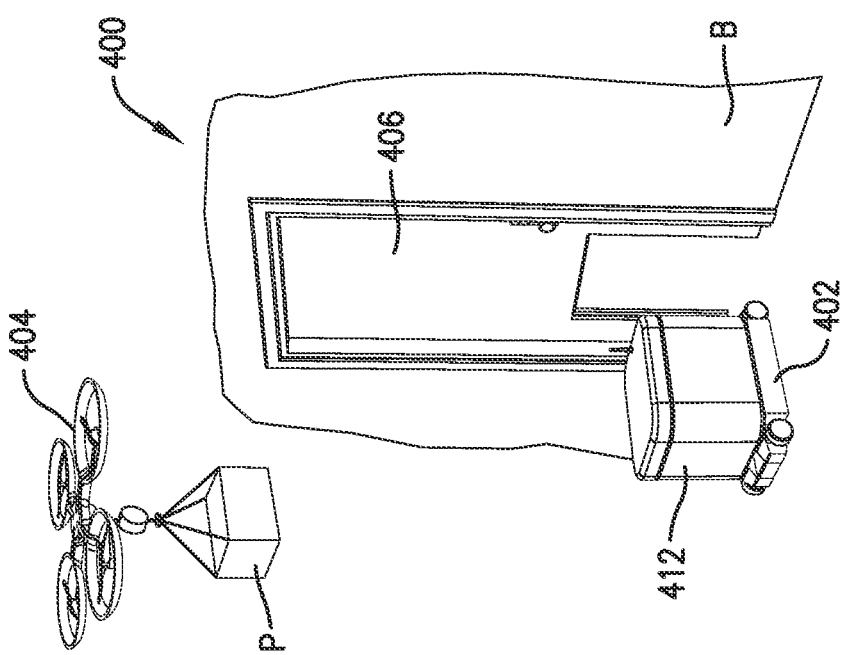
Figure 24:
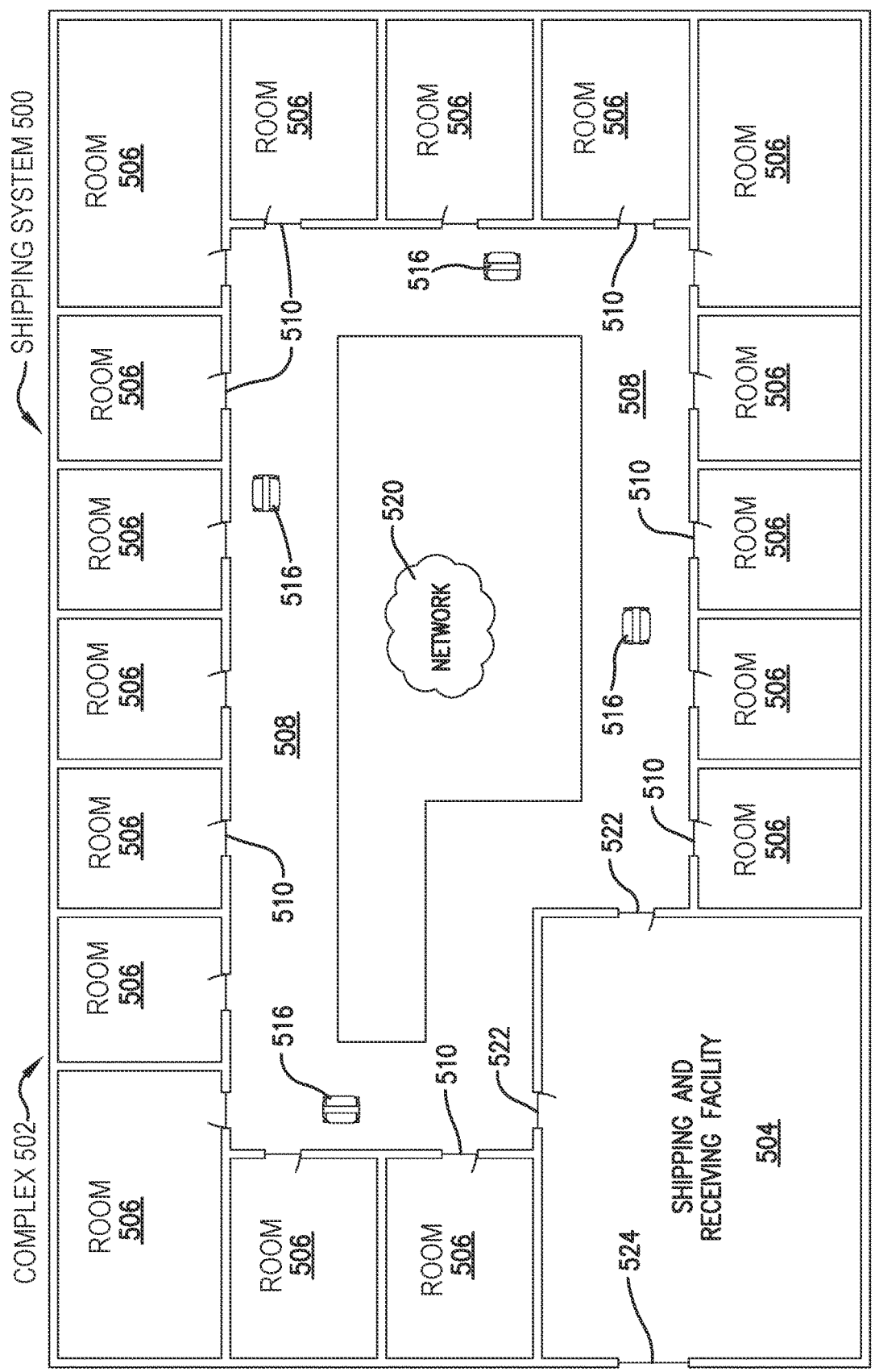
FIG. 24 is a schematic plan view of a shipping system constructed in accordance with a fourth embodiment of the present invention, with the shipping system being provided as part of a multi-tenant complex.
Figure 25:
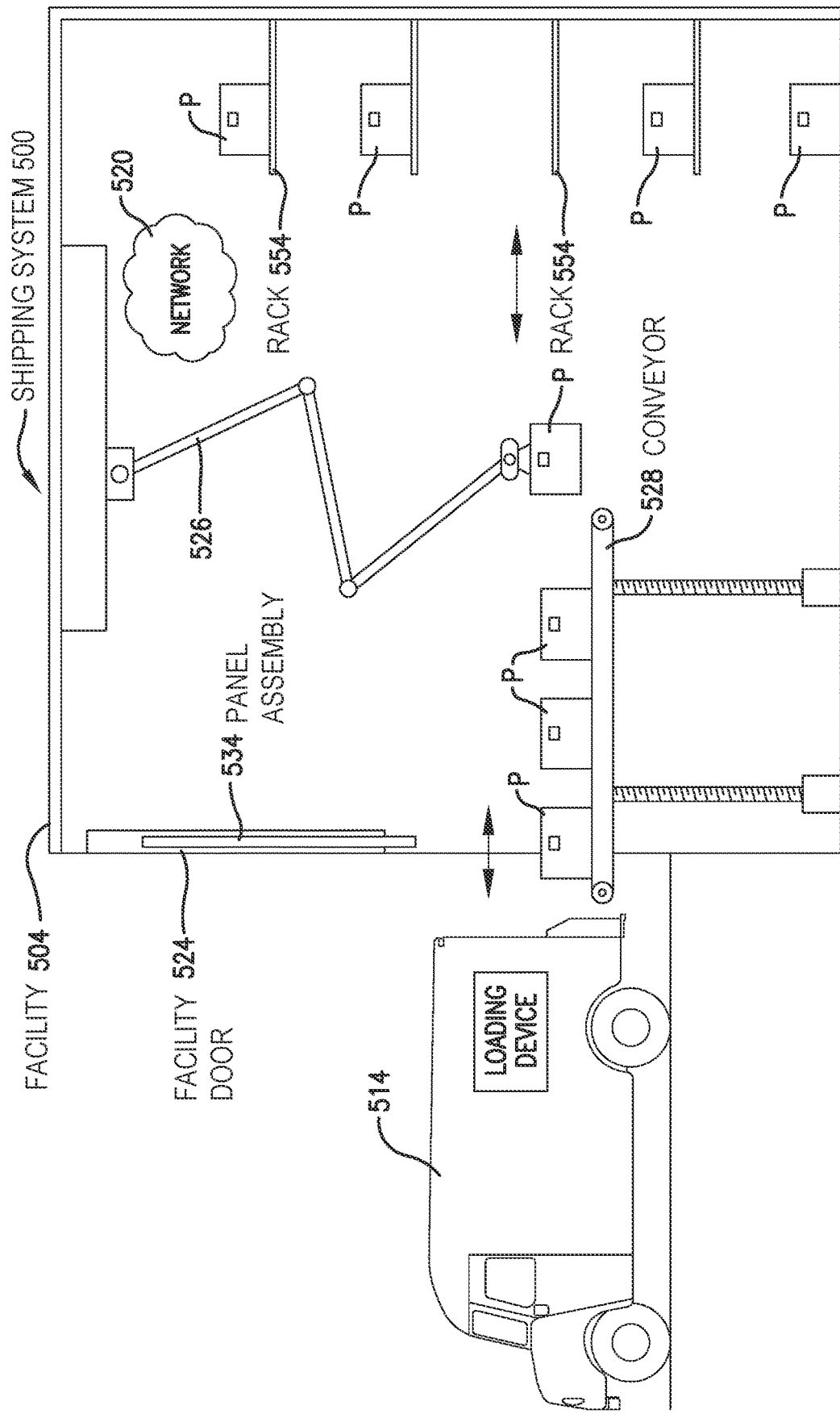
FIGS. 25 and 26 are elevational views of the shipping system shown in FIG. 24, showing the shipping system in a shipping and receiving facility of the building.
Figure 26:
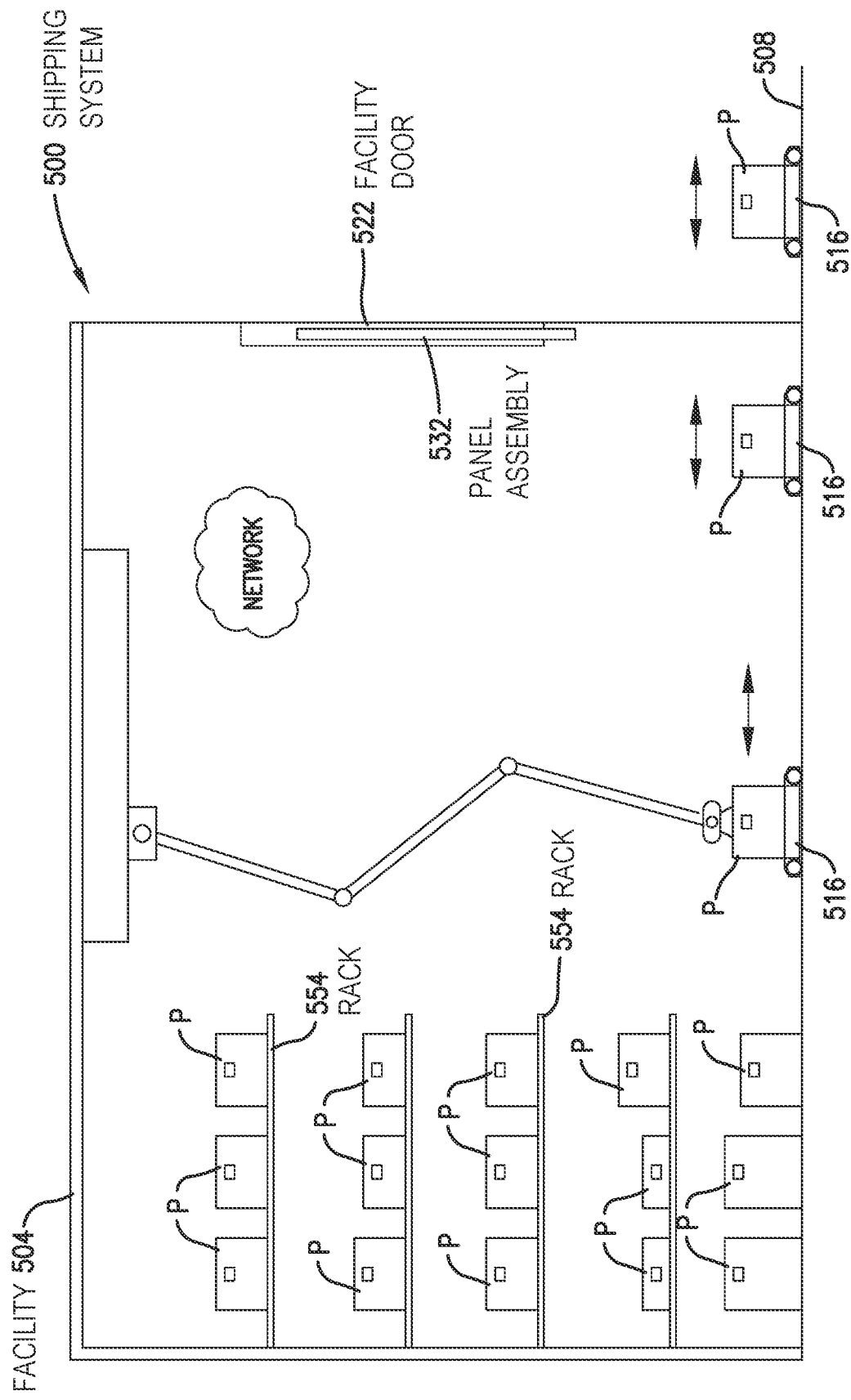
Figure 27:
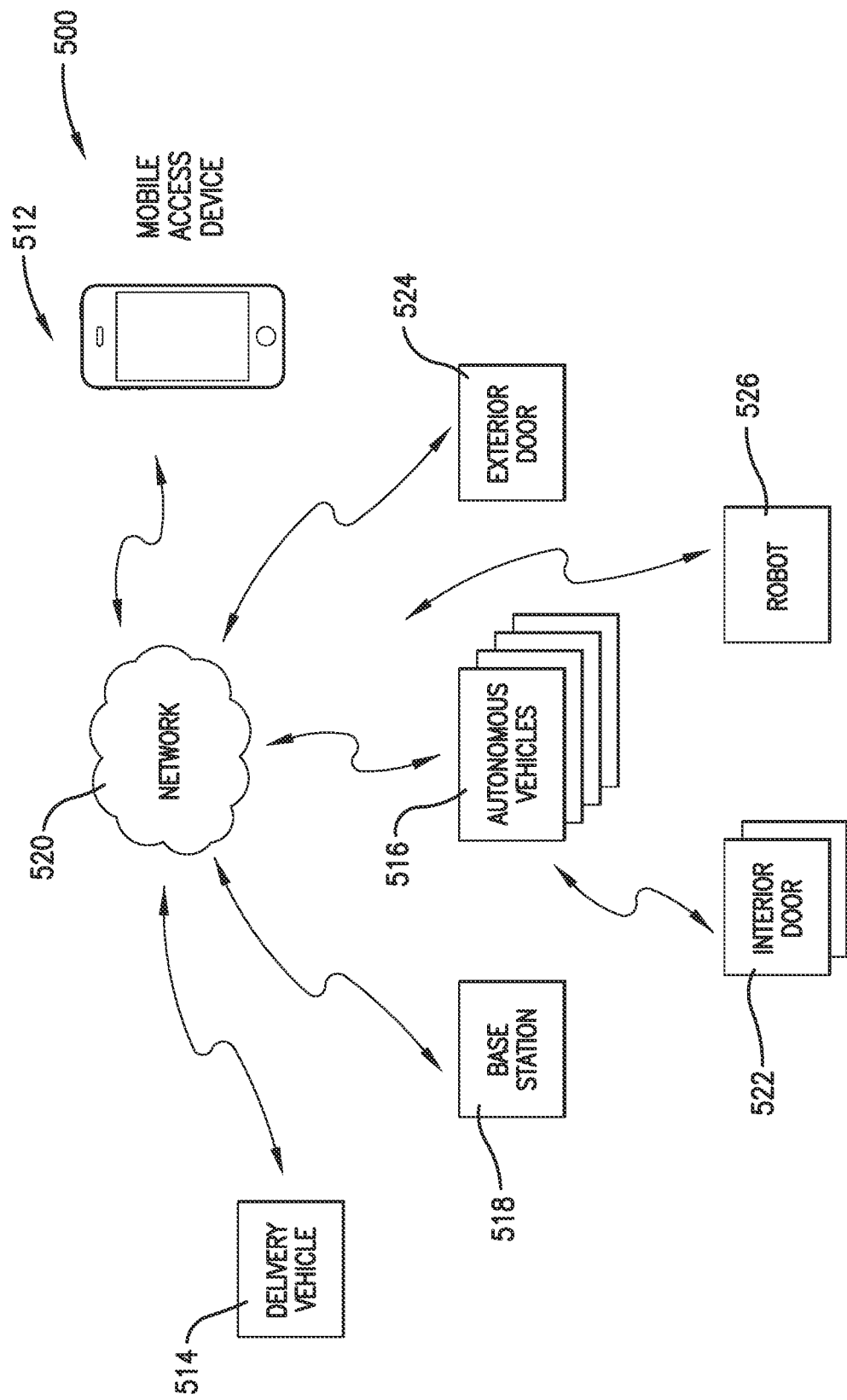
FIGS. 27-29 are schematic views of the shipping system shown in FIGS. 24-26.
Figure 29:
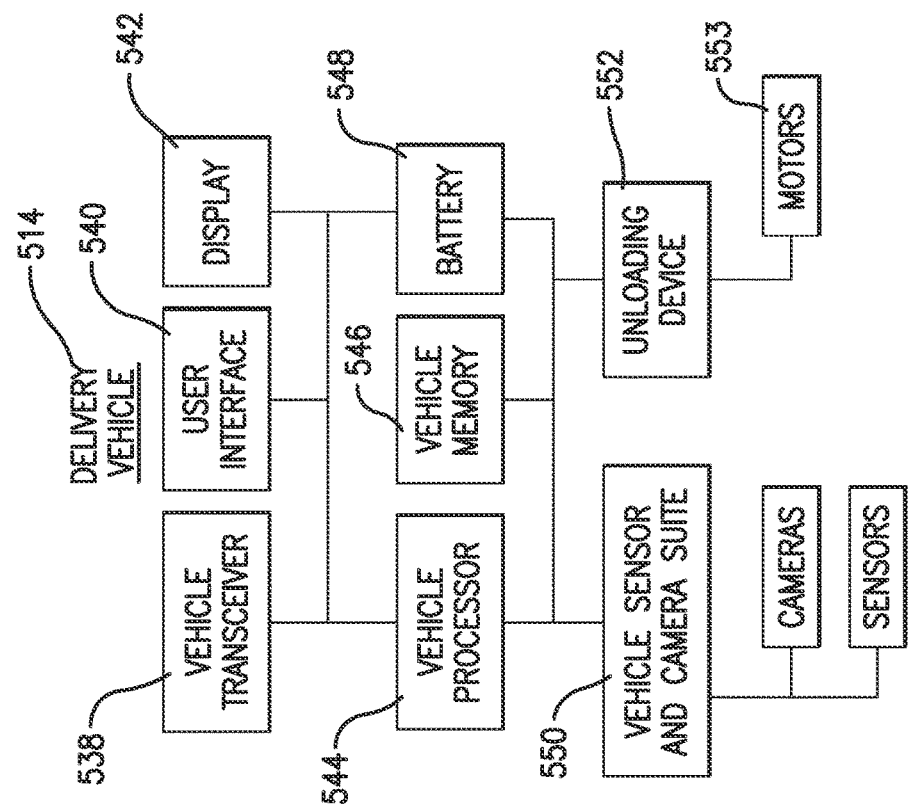
Figure 28:
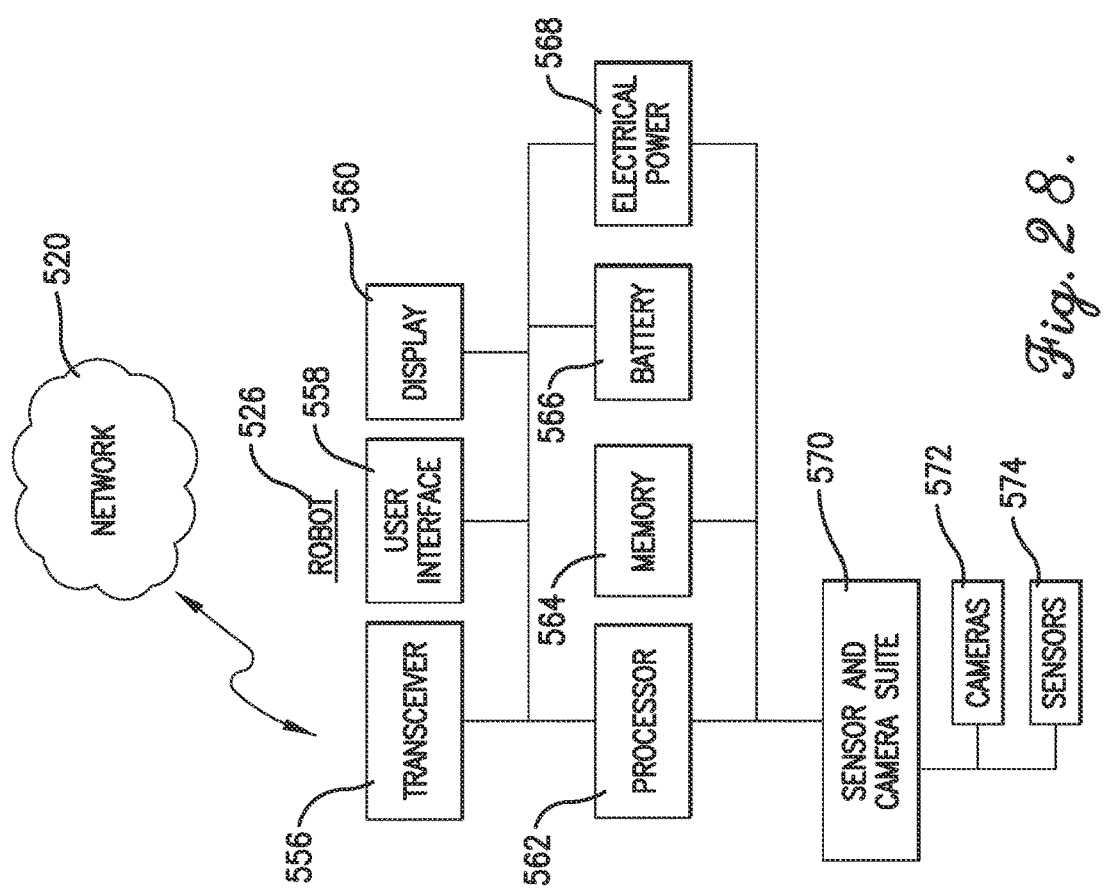

The enclosure 412 preferably includes a powered enclosure lid 414 that can be swung between open and closed positions to provide selective access to an enclosure chamber 416 (see FIG. 19). For instance, the lid 414 can be swung open for manual transfer of a package for receipt by the enclosure 412 (see FIGS. 16-21). However, the enclosure 412 may also be swung open for automated transfer of a package to the enclosure by the delivery vehicle 404. The depicted delivery vehicle 404 preferably comprises an autonomous drone configured to deposit the package in the chamber of the enclosure 412 (see FIGS. 22 and 23).

Alternative embodiments of an autonomous wheeled vehicle may be configured to support various devices for other tasks or functions inside or outside the building. For instance, alternative vehicle embodiments may have a chassis configured to be selectively coupled and uncoupled with one of multiple devices or systems that perform corresponding tasks, such as transporting an item within the building. In one such embodiment, the vehicle may be configured to support a fire extinguishing system (not shown) configured to autonomously deploy itself for extinguishing a fire in the building when the fire is sensed by the system.

Turning to FIGS. 24-30, an alternative shipping system 500 is constructed in accordance with a fourth embodiment of the present invention. The following description of system 500 will primarily describe differences of the system 500 compared to the system 30.

The shipping system 500 is preferably used in association with a multi-tenant complex 502. The depicted complex 502 includes a secure shipping and receiving facility 504 and a series of secure spaces/rooms 506 associated with corresponding tenants/occupants. The facility 504 and rooms 506 are accessible along a walkway 508.

In preferred embodiments, the complex 502 may comprise a single building that houses the facility 504, rooms 506, and walkway 508. In other preferred embodiments, the complex 502 may include multiple buildings that cooperatively house the facility 504 and rooms 506. In various embodiments, it will be appreciated that the walkway 508 or another transportation area connecting the facility 504 and rooms 506 may be located inside a building of the complex 502, outside any building of the complex 502, or have parts located inside and outside.

Each room 506 is preferably associated with a room door 510 having a panel assembly (similar to door 40) that provides secure access to the room 506 from the walkway 508 for package transfer.

The shipping system 500 includes a control system 512 for controlling package transfers associated with the facility 504 and the rooms 506. The shipping system 500 also preferably includes a delivery vehicle 514, autonomous vehicles 516, a base station 518, room doors 510, and a network 520. Yet further, the shipping system 500 preferably includes interior facility doors 522, exterior facility door 524, facility robot 526, and conveyor 528.

The interior facility doors 522 each preferably comprise a powered panel assembly 532 (similar to panel assembly 42) to selectively provide a path between the facility 504 and the walkway 508 for facility ingress and egress. The panel assembly 532 facilitates transportation of package(s) P between the facility 504 and the walkway 508 outside the facility 504 (e.g., for package transfer with one or more of the rooms 506.

In a similar manner, the exterior facility door 524 preferably comprises a powered panel assembly 534 (similar to panel assembly 42) to selectively provide a path into and out of the facility 504 for facility ingress and egress. The panel assembly 534 facilitates transfer of package(s) P between the facility 504 and the delivery vehicle 514 outside the facility 504. The facility doors 524,526, including the panel assemblies 532,534, provide elements of the control system 512, similar to the door 40 in the first embodiment described above.

The delivery vehicle 514 preferably provides elements of the control system 512, including a transceiver 538, user interface 540, display 542, processor 544, memory 546, battery 548, and the sensor and camera suite 550.

The delivery vehicle 514 may also have a powered loading device 552 configured to transfer package(s) P into or out of the delivery vehicle 514. The loading device 552 may include one or more motors 553 and may be operable to transfer the package(s) to or from the conveyor 528 and/or the robot 526. A system processor may be configured to have the conveyor 528 and/or robot 526 moved into a transfer location, which may be adjacent the delivery vehicle 514, to transfer the package(s) between locations in the facility 504 (such as shelving or racks 554) and the delivery vehicle 514, based on the vehicle location data.

The robot 526 is configured to carry and transport one or more package(s) P within the facility 504. The robot 526 preferably provides elements of the control system 512, including a transceiver 556, user interface 558, display 560, processor 562, memory 564, battery 566, a line power source 568, and a sensor and camera suite 570 with cameras 572 and sensors 574.

In one implementation, the robot 526 may be fully autonomous, while in other implementations, the robot 526 may be at least sufficiently autonomous to accomplish the functionality described herein. The robot 526 may be remotely controllable (e.g., in case of emergency or other special circumstances).

The memory 564 may be an electronic memory storing operation instructions and other relevant information for access and use by the processor 562.

The processor 562 may be an electronic processor executing one or more computer programs to control operation of the robot 526, including moving into a package transfer position relative to the delivery vehicle 514 and/or conveyor 528, moving into a package transfer position relative to a delivery person, moving into the transfer position relative to an autonomous vehicle 516, transferring one or more packages between the transfer position and a position in the facility 504 (e.g., a position on shelving 554), and/or other autonomous movement/travel. The transceiver 556 may facilitate bi-directional communication between the robot 526 and the base station 518, delivery vehicle 514, and/or the panel assembly 534 via the communications network 520, including receiving operation instructions for the robot 526.

The robot sensor and camera suite 570 may include one or more electronic cameras 572 and/or sensors 574 monitoring operations of the robot 526 and facilitating accomplishment of the functions of the robot 526, including moving into the transfer position relative to the delivery vehicle 514 and/or conveyor 528, moving into the transfer position relative to an autonomous vehicle 516, moving into the transfer position relative to the delivery person, transferring one or more packages between the transfer position and a position in the facility 504 (e.g., a position on shelving 554), and/or other autonomous movement/travel. In particular, the robot 526 may include any internal and/or external sensors and/or cameras desired or needed to accomplish autonomous movement within the facility.

The sensors 570 may include a speed sensor configured to sense and generate speed data regarding a speed of movement of the robot 526 across a location; a weight sensor configured to sense and/or generate weight data regarding the weight(s) of the supported package(s), a motor and/or engine sensor configured to sense and generate motor performance, a navigation sensor configured to sense and generate navigation data regarding a geographic location of the robot 526, one or more cameras configured to provide images of the robot 526 in operation, and/or an area around the robot 526.

The processor 562 may accomplish moving and operating the robot 526 within the facility 504 in accordance with the set of operation instructions based at least in part on the speed, weight, motor, navigation, camera, and any other sensor and/or camera data.

The robot 526 may have external sensors and/or cameras to facilitate alignment and/or engagement with the delivery vehicle 514 (such as alignment sensors to sense alignment markers on the delivery vehicle), the conveyor 528, and/or package(s) P, and/or to facilitate coupling and uncoupling with the delivery vehicle 514, conveyor 528, an autonomous vehicle 516, and/or package(s) P.

In particular, the robot 526 may have external sensors and/or cameras to facilitate the transfer of packages, such as alignment sensors to sense whether the robot 526 is properly aligned and engaged with the delivery vehicle 514, the conveyor 528, and/or package(s) P moving through the door 524. The external sensors and/or camera suite 570 may sense or provide images of the robot 526, delivery vehicle 514, the conveyor 528, and/or package(s) P to facilitate alignment, engagement, coupling and uncoupling, and/or identifying and transferring package(s).

The robot 526 may also have external sensors and/or cameras to facilitate alignment with an autonomous vehicle 516 (such as alignment sensors to sense alignment markers on the autonomous vehicle) and/or to facilitate coupling and uncoupling with the autonomous vehicle 516 and/or package(s) P.

In particular, the robot 526 may have external sensors and/or cameras to facilitate the transfer of packages, such as alignment sensors to sense whether the robot 526 is properly aligned and engaged with the autonomous vehicle 516 and/or package(s) P moving through a door 522. The external sensors and/or camera suite 570 may sense or provide images of the robot 526, autonomous vehicle 516, and/or package(s) P to facilitate alignment, engagement, coupling and uncoupling, identifying package(s), and/or transferring package(s).

In one implementation, the robot 526 may include an alignment sensor configured to sense and generate alignment data regarding a relative position of the delivery vehicle 514, package(s) P, panel assemblies 532,534, autonomous vehicle 516, and/or conveyor 528. The delivery vehicle 514, package(s) P, panel assemblies 532,534, autonomous vehicle 516, and/or conveyor 528 may present one or more alignment markers which the docking alignment sensor senses or images and uses to align itself therewith (e.g., during alignment, engagement, coupling and uncoupling, identifying package(s), and/or transferring package(s)).

The processor 562 may align the robot 526 with the delivery vehicle 514, package(s) P, panel assemblies 532, 534, autonomous vehicle 516, and/or conveyor 528 based on the alignment data from the alignment sensor. For instance, the processor 562 may align the robot 526 with the delivery vehicle 514 and/or conveyor 528 to facilitate transfer of a package between the robot 526 and the facility 504. Similarly, the processor 562 may align the robot 526 with an autonomous vehicle 516 to facilitate transfer of a package between the robot 526 and the autonomous vehicle 516.

The locations, contents, and statuses of packages may be provided in a look-up table or other data structure stored in a memory of the system 500, and the processor 562 may refer to such data to identify the location of package for transfer. Additionally or alternatively, a package identification indicia or data for each package may be indicated by a bar code or other machine readable label on an exterior package surface, and the robot 526 may sense and/or image the label to determine or confirm the identity of the package.

The robot 526 may have control and drive components, such as electrical, mechanical, and/or hydraulic controls for controlling operation of the robot 526 in accordance with operation instructions, and motors and/or engines for accomplishing the functions of the robot 526, including autonomous movement along or adjacent to the transfer location, aligning and/or engaging with the delivery vehicle 514, package(s) P, panel assemblies 532,534, autonomous vehicle 516 and/or conveyor 528, or coupling and uncoupling with the delivery vehicle 514, package(s) P, panel assemblies 532,534, autonomous vehicle 516, and/or conveyor 528, under the control of the processor 562 and the control components.

Robot location data associated with the location of the robot 562 (e.g., relative to the delivery vehicle 514, package(s) P, panel assemblies 532,534, autonomous vehicle 516 and/or conveyor 528) may be provided to the system 500.

The base station 518, robot 526, delivery vehicle 514, panel assemblies 532,534, and/or autonomous vehicle 516 may include a sensor and/or camera used to collect robot location data, which may be sent to another part of the system 500 (e.g., by sending data to the base station 518). For example, the robot 526 may include a sensor (e.g., a navigation sensor configured to sense and generate navigation data regarding a geographic location and/or navigation camera) used to collect or generate the robot location data.

It will also be appreciated that robot location data may be collected by the system 500 as part of the process to initiate a package transfer.

Figure 30:
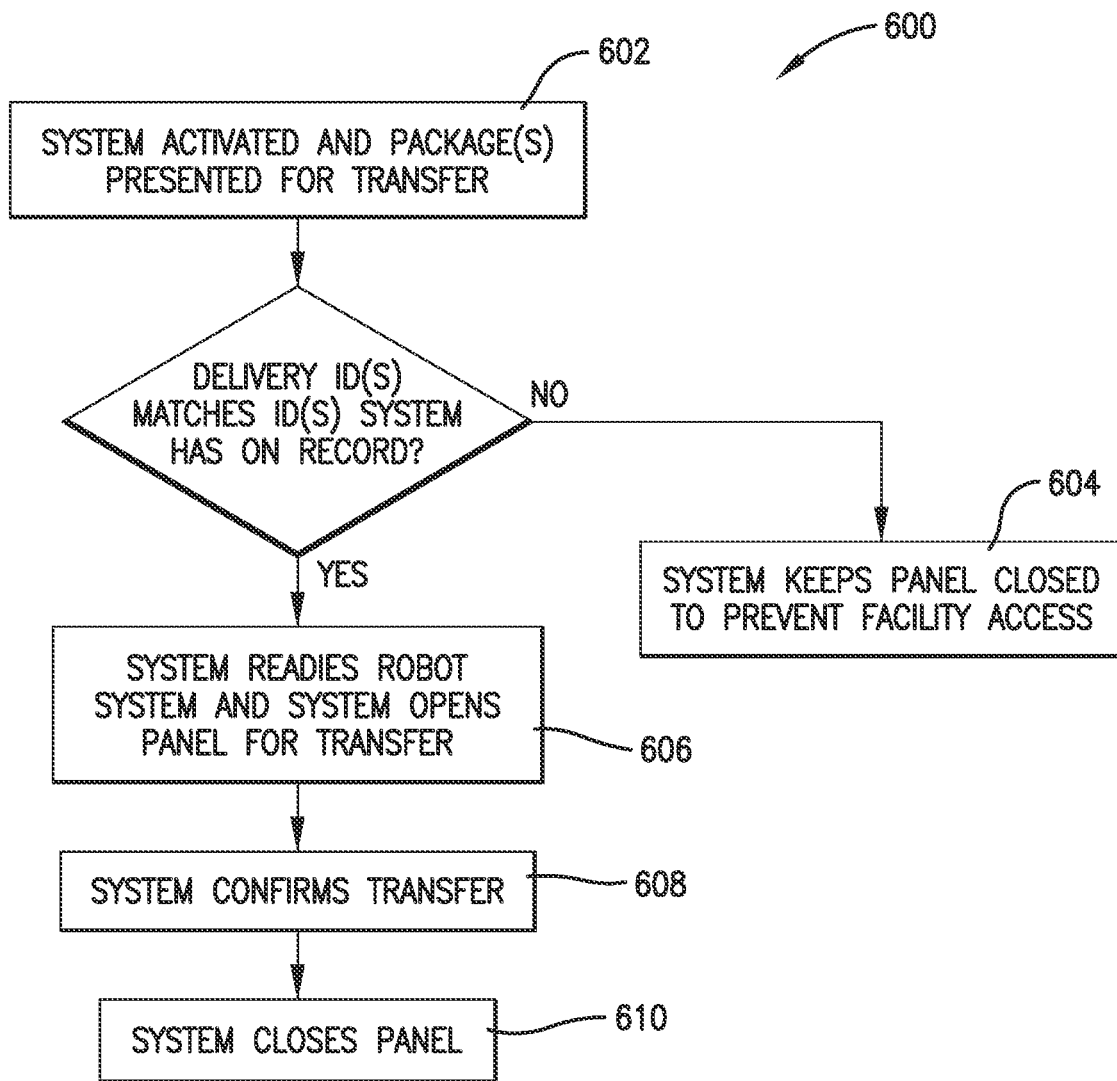
FIG. 30 is a schematic diagram of a control method of the shipping system shown in FIGS. 24-29.

Referring to FIG. 30, an embodiment of a control method 600 is shown for facilitating delivery of one or more packages relative to the facility 504. It will be appreciated that the control methods described herein may be used in connection with an incoming delivery process, where package(s) are delivered from a shipper (such as a supplier) at another location, via the delivery vehicle, to a person (i.e., a recipient) in the complex 502, and/or an outgoing delivery process, where package(s) are delivered from a person in the complex 502 (i.e., a shipper), via the delivery vehicle, to a recipient at another location. Furthermore, the described control methods may be used in connection with a delivery process where package(s) are delivered from a shipper in the complex 502 to a recipient in the complex 502.

The system 500 may be activated to initiate and conduct a package transfer, as shown in 602. In one implementation, the delivery person or delivery vehicle may provide package identification data to the system 500 (e.g., by sending data to the base station) as part of the process to initiate a package transfer. For instance, the delivery person may manually input the data through a device (see FIG. 5). Similarly, the delivery person may position a package adjacent the facility 504 so that a sensor (e.g., barcode scanner, RFID reader, etc.) and/or camera of the system 500 may collect sensor and/or camera data from the package.

The base station 518, autonomous vehicle 516, panel assembly 532,534, delivery vehicle 514, and/or another device associated with the delivery service may provide the sensor and/or camera used to collect the package identification data. The sensor and/or camera data may be collected from a barcode, RFID chip, or other identifying element that includes the package identifying data and is supplied with the package.

The sensor and/or camera data may be transmitted from the autonomous vehicle 516, panel assembly 532,534, delivery vehicle 514, and/or another device, via its corresponding transceiver, through the network 520, to the transceiver of the base station 518. In this manner, the transceiver of the base station 518 may be configured to receive package identification data associated with the package P and/or other data associated with package transfer.

The system 500 may then compare the package identifying data with a stored identifier to confirm that the package P corresponds with a shipment order. A processor of the system 500 is operable to receive package identification data associated with the package P.

If the package identifier does not match the collected package identification data, the system 500 is configured to keep the panel closed, as shown in 604.

If the package identifier matches the collected package identification data, the system 500 may have the panel assembly 532,534 open the panel to permit room ingress and egress via the panel opening, as shown in 606.

If the package identifier matches the collected package identification data, the system 500 may ready the robot 526 for package transfer, see 606. The system 500 may have the robot 526 advance itself to a ready position adjacent the respective panel assembly 532,534, where the robot 526 may be aligned with the corresponding panel opening.

The system 500 is configured to have the robot 526 align itself with the panel opening, another element of the panel assembly 532,534, and/or another structure in the facility 504 via alignment markers (not shown).

In one implementation, with the robot 526 in the ready position and the panel opened, the robot 526 may be configured to receive a package or release a package therefrom. In another implementation, with the robot 526 in the ready position and the panel opened, the robot 526 may be configured to be at least partly advanced through the panel opening for room egress to receive a package or to release a package.

Robot location data associated with the location of the robot 526 may be provided to the system 500. It will also be appreciated that package location data and/or package transfer data may be collected by the system 500 as part of the process of a package transfer.

The base station 518, autonomous vehicle 516, delivery vehicle 514, robot 526, and/or panel assembly 532,534 may include a sensor and/or camera used to collect package transfer data and/or package transfer data, which may be sent to another part of the system 500.

For example, the robot 526 may include a weight sensor configured to indicate a change in package weight supported by the robot 526. In another implementation, package transfer data may be provided by sensor data (such as data from a proximity sensor) and/or camera data from the system 500 indicating an addition or removal of a package supported by or coupled relative to the robot 526. Associated sensor or camera data may be provided by the delivery vehicle 514, autonomous vehicle 516, panel assembly 532,534, robot 526, and/or base station 518. In another implementation, package transfer data may be generated by manual input to a user interface of the system 500 by the delivery driver and/or a building occupant.

In one implementation, package transfer completion may be confirmed, as shown in 608, by sensor data from a package transfer sensor of the system 500 configured to sense transfer of the package relative to the robot 526 (e.g., where the package is released by the robot 526 onto the conveyor 528 or an autonomous vehicle 516).

Subsequent to confirmation of package transfer in 608, based upon a determination that the package(s) has been transferred into or out of the facility 504, the system 500 may have the panel assembly 532,534 secure the respective panel closed to restrict room ingress and egress via the panel opening, as shown in 610.

A processor of the system 500 may be configured to move the robot 526 to transfer the package(s) between the delivery vehicle 514 and the robot 526.

The processor 544 of the delivery vehicle 514 may be configured to operate a loading device 552 to transfer the package into or out of the delivery vehicle 514. A robot sensor may configured to sense robot location data associated with the location of the 552 relative to the delivery vehicle 514. The processor 544 of the delivery vehicle 514 and/or another processor of the system 500 may be configured to move the 552 into a location adjacent the delivery vehicle 514 to transfer the package(s) between the 552 and the delivery vehicle 514, based on the robot location data.

The robot sensor may be configured to sense robot location data associated with the location of the 552 relative to the delivery vehicle 514, package(s) P, panel assemblies 532,534, autonomous vehicle 516 and/or conveyor 528. The processor 544 of the delivery vehicle 514 and/or another processor of the system 500 may be configured to move the robot 526 and/or the autonomous vehicle 516 adjacent one another to transfer the package between the robot 526 and the autonomous vehicle 516, based on the robot location data and/or the vehicle location data.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

The invention claimed is:

1. A control system configured to facilitate transfer of a package between a room in a building and a delivery vehicle outside the room associated with a shipment order, said control system for controlling a shiftable panel of the building to selectively provide a path into and out of the room and an autonomous vehicle configured to be advanced along the path to receive the package, said control system comprising:
   a location sensor configured to sense package location data associated with a location of the package relative to the panel,
   a vehicle sensor configured to sense vehicle location data associated with a location of the autonomous vehicle relative to the panel; and
   a system processor configured to
      receive package identification data associated with the package,
      permit panel opening to allow room ingress and egress along the path based on the package identification data,
      move the autonomous vehicle to a location adjacent the panel to receive the package, based on the vehicle location data, and
      secure the panel closed to restrict the room ingress and egress along the path based on the package location data from the location sensor and corresponding to a determination that the package has been transferred into or out of the room via the path.

2. The control system as claimed in claim 1, further comprising:
   a package identifying sensor configured to sense the package identification data.

3. The control system as claimed in claim 2,
   said system processor configured to access a data structure containing an identifier for the package, with the identifier being generated in connection with creation of the shipment order, and based thereon, comparing the identifier and the package identification data to confirm a match therebetween, such that the package corresponds with the shipment.

4. The control system as claimed in claim 3,
said system processor configured to open the panel to allow the room ingress and egress based upon confirmation that the identifier and package identification data match one another.

5. The control system as claimed in claim 3,
said system processor configured to have the autonomous vehicle moved based upon confirmation that the identifier and the package identification data match one another.

6. The control system as claimed in claim 2,
said package identifying sensor including at least one of a barcode scanner, RFID reader, and camera.

7. The control system as claimed in claim 1,
said location sensor being configured to directly sense the location of the package corresponding to the package location data, said location sensor including at least one of a barcode scanner, RFID reader, and camera.

8. The control system as claimed in claim 1, further comprising:
a package transfer sensor configured to sense package transfer data associated with the package being received by the autonomous vehicle or removed relative to the autonomous vehicle,
said system processor configured to position the autonomous vehicle inside or outside the room for package transfer,
said system processor configured to have the autonomous vehicle moved to advance the package into or out of the room, based on package transfer data from the package transfer sensor.

9. The control system as claimed in claim 1, further comprising:
a delivery transceiver associated with the delivery vehicle and configured to send the package identification data associated with the package; and
a system transceiver configured to receive the package identification data associated with the package from the delivery transceiver.

10. The control system as claimed in claim 1, further comprising:
a delivery processor configured to operate a loading device to transfer the package into or out of the delivery vehicle,
said system processor and/or said delivery processor configured to have the autonomous vehicle moved into a location adjacent the delivery vehicle to transfer the package between the autonomous vehicle and the delivery vehicle, based on the vehicle location data.

11. The control system as claimed in claim 1,
said system processor configured to have an autonomous robot moved in the room to transfer the package between the delivery vehicle and the autonomous robot.

12. The control system as claimed in claim 11, further comprising:
a delivery processor configured to operate a loading device to transfer the package into or out of the delivery vehicle, and
a robot sensor configured to sense robot location data associated with a location of the autonomous robot relative to the delivery vehicle,
said system processor and/or said delivery processor configured to have the autonomous robot moved into a location adjacent the delivery vehicle to transfer the package between the autonomous robot and the delivery vehicle, based on the robot location data.

13. The control system as claimed in claim 11, further comprising:
a robot sensor configured to sense robot location data associated with the location of the autonomous robot relative to the panel,
said system processor configured to move the autonomous robot and/or the autonomous vehicle adjacent one another to transfer the package between the autonomous robot and the autonomous vehicle, based on the robot location data and the vehicle location data.

14. A control system configured to facilitate transfer of a package between a room in a building and a delivery vehicle outside the room associated with a shipment order, said control system for controlling a shiftable panel of the building to selectively provide a path into and out of the room, said control system comprising:
a location sensor configured to sense package location data associated with a location of the package relative to the panel; and
a system processor configured to
receive package identification data associated with the package,
permit panel opening to allow room ingress and egress along the path based on the package identification data,
determine that the package has been transferred into or out of the room via the path based on the package location data from the location sensor, and
secure the panel closed to restrict the room ingress and egress along the path based on the package location data from the location sensor sensing that the package has been transferred into or out of the room via the path.

15. The control system as claimed in claim 14, further comprising:
a package identifying sensor configured to sense the package identification data.

16. The control system as claimed in claim 15,
said system processor configured to access a data structure containing an identifier for the package, with the identifier being generated in connection with creation of the shipment order, and based thereon, comparing the identifier and the package identification data to confirm a match therebetween, such that the package corresponds with the shipment.

17. The control system as claimed in claim 16,
said system processor configured to open the panel to allow the room ingress and egress based upon confirmation that the identifier and the package identification data match one another.

18. The control system as claimed in claim 15,
said package identifying sensor including at least one of a barcode scanner, RFID reader, and camera.

19. The control system as claimed in claim 14, further comprising:
a delivery transceiver associated with the delivery vehicle and configured to send the package identification data associated with the package; and
a system transceiver configured to receive the package identification data associated with the package from the delivery transceiver.

20. The control system as claimed in claim 14, further comprising:
a delivery processor configured to operate a loading device to transfer the package into or out of the delivery vehicle.

21. The control system as claimed in claim 14, further comprising:
a delivery vehicle sensor configured to sense delivery vehicle location data associated with the location of the delivery vehicle relative to the panel, and
a delivery processor of the delivery vehicle and/or said system processor configured to have the delivery vehicle move to a location adjacent the panel to transfer the package between the delivery vehicle and the room, based on the delivery vehicle location data.

22. A shipping system configured to facilitate transfer of a package between a room in a building and a delivery vehicle outside the room associated with a shipment order, said shipping system being operable to selectively provide a path into and out of the room for package transfer, said shipping system comprising:
a shiftable panel assembly operable to be constructed as part of the building and including a shiftable panel that is shiftable between open and closed positions to selectively provide access to the room; and
a control system configured to facilitate transfer of a package between the room and the delivery vehicle,
said control system configured to control the shiftable panel to selectively provide the path into and out of the room,
said control system including
a location sensor configured to sense package location data associated with the location of the package relative to the panel; and
a system processor configured to
receive package identification data associated with the package,
permit panel opening to allow room ingress and egress along the path based on the package identification data,
determine that the package has been transferred into or out of the room via the path based on the package location data from the location sensor, and
secure the panel closed to restrict the room ingress and egress along the path based on the package location data from the location sensor sensing that the package has been transferred into or out of the room via the path.

23. The shipping system as claimed in claim 22, further comprising:
a package identifying sensor configured to sense the package identification data.

24. The shipping system as claimed in claim 23,
said system processor configured to access a data structure containing an identifier for the package, with the identifier being generated in connection with creation of the shipment order, and based thereon, comparing the identifier and the package identification data to confirm a match therebetween, such that the package corresponds with the shipment.

25. The shipping system as claimed in claim 24,
said system processor configured to open the panel to allow the room ingress and egress based upon confirmation that the identifier and the package identification data match one another.

26. The shipping system as claimed in claim 24,
said system processor configured to move an autonomous vehicle based upon confirmation that the identifier and the package identification data match one another.

27. The shipping system as claimed in claim 23,
said package identifying sensor including at least one of a barcode scanner, RFID reader, and camera.

28. The shipping system as claimed in claim 22,
said location sensor being configured to directly sense the location of the package corresponding to the package location data, said location sensor including at least one of a barcode scanner, RFID reader, and camera.

29. The shipping system as claimed in claim 22, further comprising:
an autonomous vehicle configured to be advanced along the path to receive the package; and a vehicle sensor configured to sense vehicle location data associated with a location of the autonomous vehicle relative to the panel,
said system processor being configured to move the autonomous vehicle to a location adjacent the panel to receive the package, based on the vehicle location data.

30. The shipping system as claimed in claim 22, further comprising:
a package transfer sensor configured to sense package transfer data associated with the package being received by the vehicle or removed relative to the vehicle,
said system processor configured to position an autonomous vehicle inside or outside the room for package transfer,
said system processor configured to have the autonomous vehicle moved to advance the package into or out of the room, based on package transfer data from the package transfer sensor.

31. The shipping system as claimed in claim 22, further comprising:
a delivery transceiver associated with the delivery vehicle and configured to send the package identification data associated with the package; and
a system transceiver configured to receive the package identification data associated with the package from the delivery transceiver.

32. The shipping system as claimed in claim 22, further comprising:
a delivery processor configured to operate a loading device to transfer the package into or out of the delivery vehicle,
said system processor and/or said delivery processor configured to move an autonomous vehicle into a location adjacent the delivery vehicle to transfer the package between the autonomous vehicle and the delivery vehicle, based on vehicle location data associated with a location of the autonomous vehicle and/or a location of the delivery vehicle.

33. The shipping system as claimed in claim 22, further comprising:
an autonomous robot configured to be operably supported in the room,
said system processor configured to move the autonomous robot to transfer the package between the delivery vehicle and the autonomous robot.

34. The shipping system as claimed in claim 33, further comprising:
a delivery processor configured to operate a loading device to transfer the package into or out of the delivery vehicle, and a robot sensor configured to sense robot location data associated with a location of the autonomous robot relative to the delivery vehicle, said system processor and/or said delivery processor configured to move the autonomous robot into a location adjacent the delivery vehicle to transfer the package between the autonomous robot and the delivery vehicle, based on the robot location data.

35. The shipping system as claimed in claim 33, further comprising:

a robot sensor configured to sense robot location data associated with a location of the autonomous robot relative to the panel, said system processor configured to move the autonomous robot and/or the autonomous vehicle adjacent one another to transfer the package between the autonomous robot and the autonomous vehicle, based on the robot location data and based on vehicle location data associated with a location of the autonomous vehicle.

* * * * *